United States Patent
Jonsson et al.

(10) Patent No.: US 11,483,890 B2
(45) Date of Patent: Oct. 25, 2022

(54) FIRST UNIT, SECOND UNIT AND METHODS IN A WIRELESS COMMUNICATIONS NETWORK

(71) Applicant: Telefonaktiebolaget LM Ericsson (publ), Stockholm (SE)

(72) Inventors: Anders Jonsson, Täby (SE); Angelo Centonza, Stockholm (SE); Matteo Fiorani, Solna (SE); Martin Skarve, Enebyberg (SE)

(73) Assignee: Telefonaktiebolaget LM Ericsson (Publ), Stockholm (SE)

( * ) Notice: Subject to any disclaimer, the term of this patent is extended or adjusted under 35 U.S.C. 154(b) by 475 days.

(21) Appl. No.: 16/475,575

(22) PCT Filed: Apr. 4, 2019

(86) PCT No.: PCT/SE2019/050309
§ 371 (c)(1),
(2) Date: Jul. 2, 2019

(87) PCT Pub. No.: WO2019/194735
PCT Pub. Date: Oct. 10, 2019

(65) Prior Publication Data
US 2021/0368574 A1  Nov. 25, 2021

Related U.S. Application Data

(60) Provisional application No. 62/653,597, filed on Apr. 6, 2018.

(51) Int. Cl.
*H04W 76/20* (2018.01)
*H04W 24/02* (2009.01)
(Continued)

(52) U.S. Cl.
CPC ........... *H04W 76/20* (2018.02); *H04W 24/02* (2013.01); *H04W 88/085* (2013.01); *H04W 92/20* (2013.01)

(58) Field of Classification Search
CPC .. H04B 10/2575; H04W 76/20; H04W 24/02; H04W 88/085; H04W 92/20;
(Continued)

(56) References Cited

U.S. PATENT DOCUMENTS

| 2016/0212721 A1 | 7/2016 | Sheng et al. | |
| 2017/0048739 A1* | 2/2017 | Jeong | H04L 67/10 |
| 2018/0007176 A1* | 1/2018 | Suthar | H04L 69/04 |

FOREIGN PATENT DOCUMENTS

| CN | 101107871 A | 1/2008 |
| EP | 3095291 A1 | 7/2015 |

(Continued)

OTHER PUBLICATIONS

Russian Office Action with English language Summary Translation dated Apr. 6, 2021 for International Application No. 2020136377/07 filed on Apr. 4, 2019, consisting of 8-pages.
(Continued)

*Primary Examiner* — Pankaj Kumar
*Assistant Examiner* — Eric Phu
(74) *Attorney, Agent, or Firm* — Christopher & Weisberg, P.A.

(57) ABSTRACT

A method performed by a first unit for handling a connection between the first unit and multiple second units in a wireless communications network is provided. The first unit obtains from each of the multiple second units a respective indication of which one or more version of NR User plane protocol (NR-U) it supports. The first unit decides which version of NR-U that is possible to use for the connection based on the indications received from the multiple second units.

6 Claims, 20 Drawing Sheets

(51) Int. Cl.
*H04W 88/08* (2009.01)
*H04W 92/20* (2009.01)

(58) Field of Classification Search
CPC ..... H04W 36/00; H04W 40/36; H04W 52/02; H04W 16/18; H04W 36/0083; H04W 88/18; H04L 41/0823
See application file for complete search history.

(56) References Cited

FOREIGN PATENT DOCUMENTS

| | | | |
|---|---|---|---|
| JP | 2004064446 A | 2/2004 | |
| JP | 2012239152 A | 12/2012 | |
| KR | 20170087054 A | 7/2017 | |
| RU | 2616169 C2 | 4/2017 | |
| RU | 2638828 C1 | 12/2017 | |
| WO | 2018009340 A1 | 1/2018 | |
| WO | 2018030529 A1 | 2/2018 | |
| WO | 2018030798 A1 | 2/2018 | |

OTHER PUBLICATIONS

3GPP TS 38.425 V15.0.0; 3rd Generation Partnership Project; Technical Specification Group Radio Access Network; NG-RAN; NR user plane protocol (Release 15); Dec. 2017, consisting of 17-pages.
International Search Report and Written Opinion dated Aug. 7, 2019 for International Application No. PCT/SE2019/050309 filed on Apr. 4, 2019, consisting of 14-pages.
3GPP TSG-RAN WG2 #101 R2-1803878; Title: Miscellaneous corrections; Source to WG: ZTE; Source to TSG: R2; Location and Date: Athens, Greece, Feb. 26-Mar. 2, 2018, consisting of 31-pages.
3GPP TSG CT4 Meeting #77 C4-172051; Title: Pseudo-CR on Handling of different PFCP versions; Source: Nokia, Alcatel-Lucent Shanghai Bell; Spec: 3GPP TS 29.244 v1.0.0; Agenda Item: 7.1.5; Document for: Decision; Location and Date: Spokane, US, Apr. 3-7, 2017, consisting of 4-pages.
3GPP TS 38.401 V15.0.0; 3rd Generation Partnership Project; Technical Specification Group Radio Access Network; NG-RAN; Architecture description (Release 15); Dec. 2017, consisting of 23-pages.
3GPP TS 38.801 V14.0.0; 3rd Generation Partnership Project; Technical Specification Group Radio Access Network; Study on new radio access technology: Radio access architecture (Release 14); Mar. 2017, consisting of 91-pages.
3GPP TS 38.463 V0.1.0; 3rd Generation Partnership Project; Technical Specification Group Radio Access Network; NG-RAN E1 application protocol (E1AP) (Release 15); Mar. 2018, consisting of 15-pages.
3GPP TS 38.473 V15.0.0; 3rd Generation Partnership Project; Technical Specification Group Radio Access Network; NG-RAN F1 application protocol (F1AP) (Release 15); Dec. 2017, consisting of 90-pages.
3GPP TS 23.501 V15.1.0; 3rd Generation Partnership Project; Technical Specification Group Services and System Aspects; System Architecture for the 5G System; Stage 2 (Release 15); Mar. 2018, consisting of 201-pages.
Indian Examination Report dated Dec. 8, 2021 for Application No. 202047047892, consisting of 6 pages.
Japanese Notice of Allowance and English machine translation dated Dec. 6, 2021 for Application No. 2020-553487, consisting of 6 pages.
3GPP TSG-RAN WG3#99 R3-181382; Title: Data Retransmission Indication; Source: ZTE, NTT Docomo; Work item code: NR_newRAT-Core; Location and Date: Athens, Greece, Feb. 26-Mar. 2, 2018, consisting of 8 pages.
3GPP TSG-RAN WG3 Meeting #99bis R3-182186; Title: Support for UP Version Handling; Agenda Item: 10.9; Source: Ericsson; Document for: Discussions & Approval; Location and Date: Sanya, China, Apr. 16-20, 2018, consisting of 3 pages.
3GPP TSG-RAN WG3 Meeting #99bis R3-182187; Title: Introduction of UP Protocol Version Handling; Source: Ericsson; Work item code: NR_newRAT-Core; Location and Date: Sanya, China, Apr. 16-20, 2018, consisting of 9 pages.

\* cited by examiner

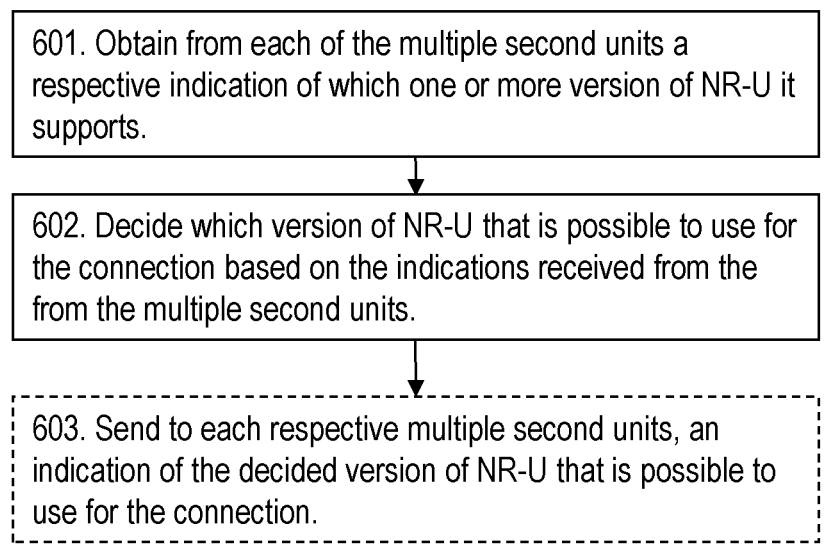
Fig. 6  Method in the first unit 501

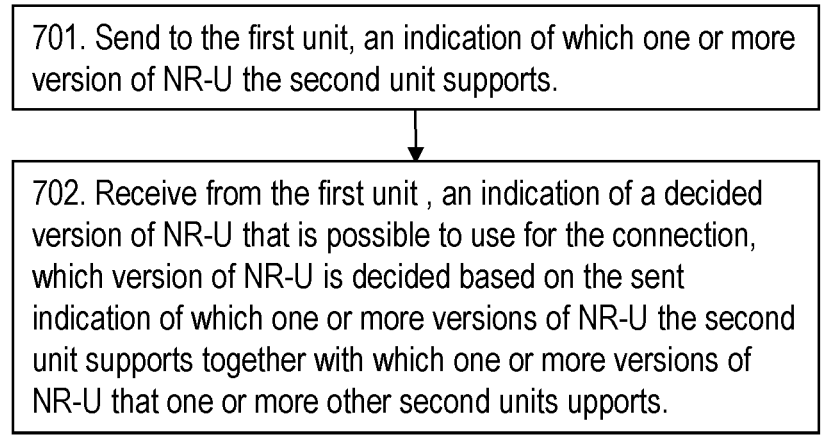
Fig. 7 Method in a second unit 502

| Bits | | | | | | | | Number of Octets |
|---|---|---|---|---|---|---|---|---|
| 7 | 6 | 5 | 4 | 3 | 2 | 1 | 0 | |
| PDU Type (=0) | | | | Version info | DL Discard Blocks | DL Flush | Report polling | 1 |
| Version Control information ||||||||  1 |
| NR-U Sequence Number ||||||||  3 |
| DL discard NR PDCP PDU SN ||||||||  3 |
| DL discard Number of blocks ||||||||  1 |
| DL discard NR PDCP PDU SN start (first block) ||||||||  3 |
| Discarded Block size (first block) ||||||||  1 |
| ... ||||||||   |
| DL discard NR PDCP PDU SN start (last block) ||||||||  3 |
| Discarded Block size (last block) ||||||||  1 |
| Spare extension ||||||||  0-4 |

| | | | Bits 1110 | | | | | Number of Octets |
|---|---|---|---|---|---|---|---|---|
| 7 | 6 | 5 | 4 | 3 | 2 | 1 | 0 | |
| PDU Type (=0) | | | | spare | DL Discard Blocks | DL Flush | Report polling | 1 |
| Version Control information ||||||||  1 |
| NR-U Sequence Number ||||||||  3 |
| DL discard NR PDCP PDU SN ||||||||  3 |
| DL discard Number of blocks ||||||||  1 |
| DL discard NR PDCP PDU SN start (first block) ||||||||  3 |
| Discarded Block size (first block) ||||||||  1 |
| ... ||||||||   |
| DL discard NR PDCP PDU SN start (last block) ||||||||  3 |
| Discarded Block size (last block) ||||||||  1 |
| Spare extension ||||||||  0-4 |

Fig. 11

| Bits | | | | | | | | Number of Octets |
|---|---|---|---|---|---|---|---|---|
| 7 | 6 | 5 | 4 | 3 | 2 | 1 | 0 | |
| PDU Type (=1) | | | | Highest Transmitted NR PDCP SN Ind | Highest Delivered NR PDCP SN Ind | Final Frame Ind. | Lost Packet Report | 1 |
| Spare | | | | | | | Cause Report | 1 |
| Desired buffer size for the data bearer | | | | | | | | 4 |
| Minimum desired buffer size for the UE | | | | | | | | 4 |
| Number of lost NR-U Sequence Number ranges reported | | | | | | | | 1 |
| Start of lost NR-U Sequence Number range | | | | | | | | 6* (Number of reported lost NR-U SN ranges) |
| End of lost NR-U Sequence Number range | | | | | | | | |
| Highest successfully delivered NR PDCP Sequence Number | | | | | | | | 3 |
| Highest transmitted NR PDCP Sequence Number | | | | | | | | 3 |
| Cause Value | | | | | | | | 1 |
| Version Control Information | | | | | | | | 1 |
| Spare extension — 1310 | | | | | | | | 1-6 |

Fig. 13

| Bits | | | | | | | | Number of Octets |
|---|---|---|---|---|---|---|---|---|
| 7 | 6 | 5 | 4 | 3 | 2 | 1 | 0 | |
| PDU Type (=1) | | | | Highest Transmitted NR PDCP SN Ind | Highest Delivering NR PDCP SN Ind | Final Frame Ind. | Lost Packet Report | 1 |
| Spare | | | | | | Version info | Cause Report | 1 |
| Desired buffer size for the data bearer ||||||||4|
| Minimum desired buffer size for the UE ||||||||4|
| Number of lost NR-U Sequence Number ranges reported ||||||||1|
| Start of lost NR-U Sequence Number range ||||||||6* (Number of reported lost NR-U SN ranges)|
| End of lost NR-U Sequence Number range ||||||||
| Highest successfully delivered NR PDCP Sequence Number ||||||||3|
| Highest transmitted NR PDCP Sequence Number ||||||||3|
| Cause Value ||||||||1|
| Version Control Information ||||||||1|
| Spare extension ||||||||1-7|

1410 — info

Fig. 14

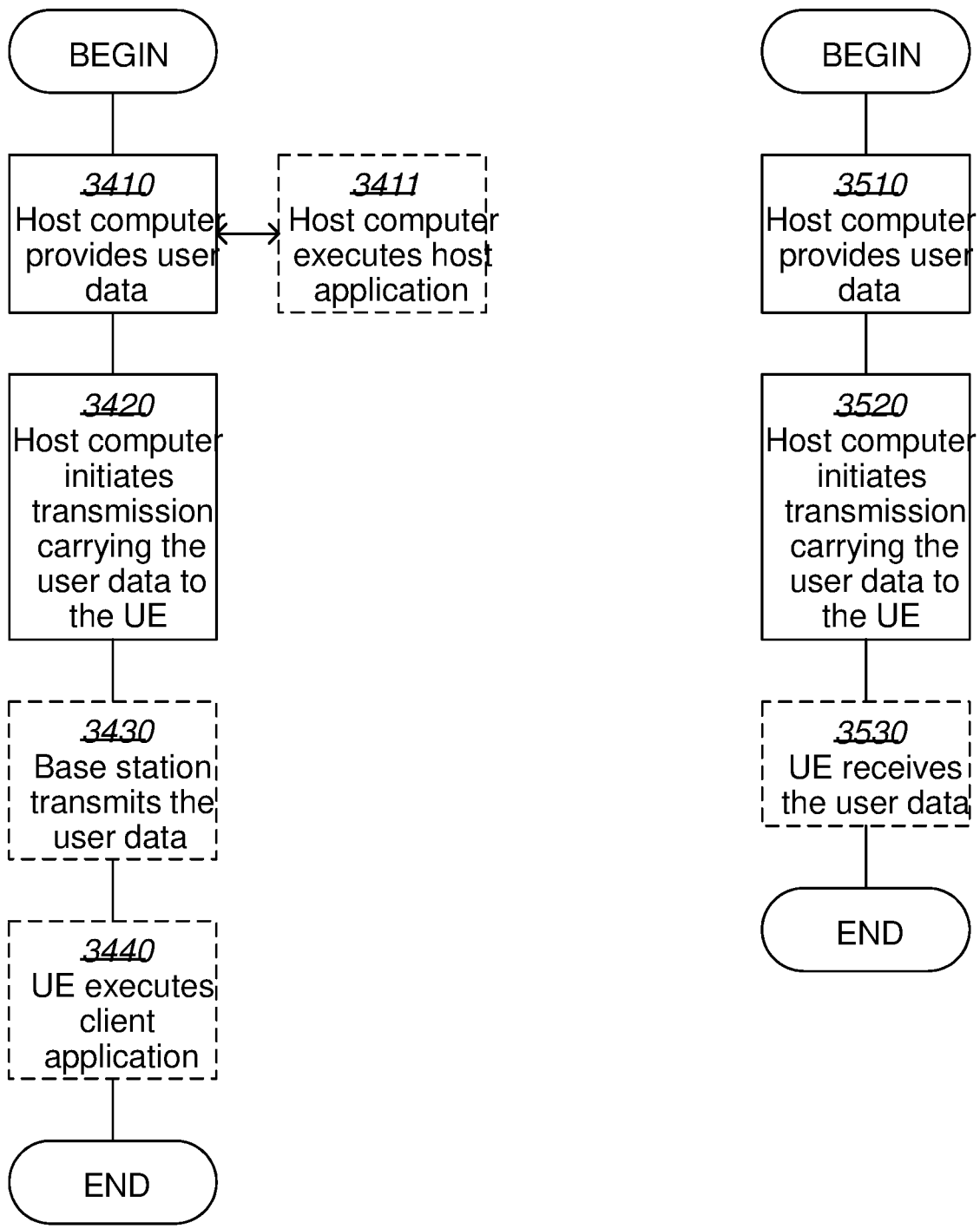

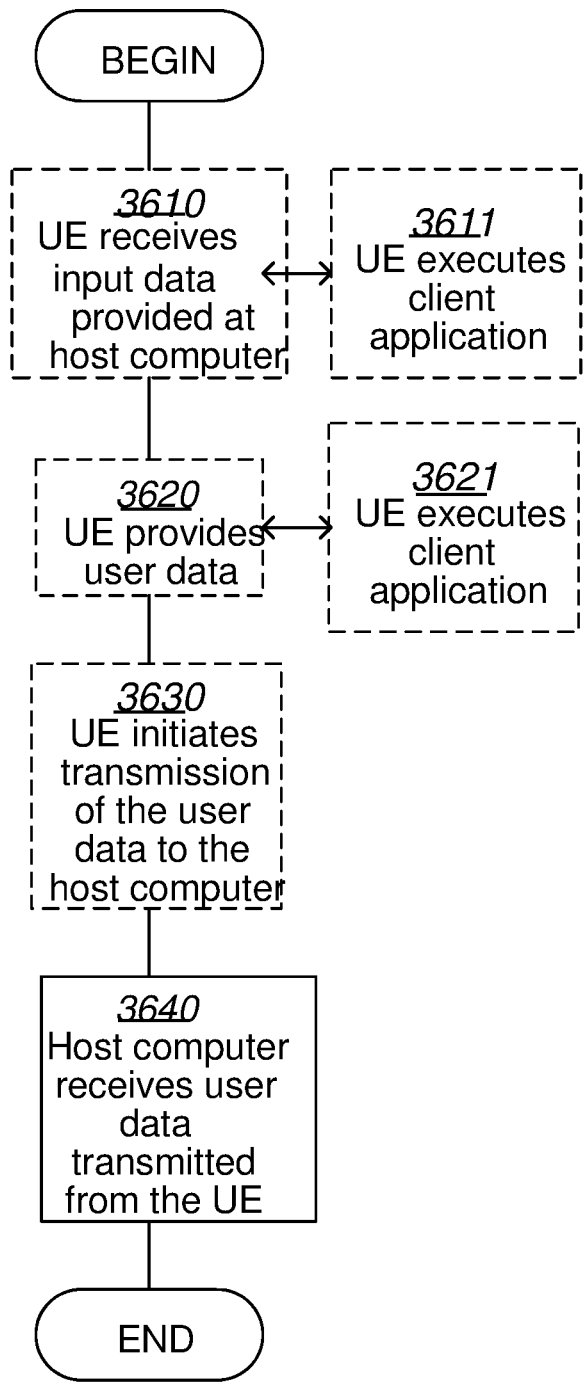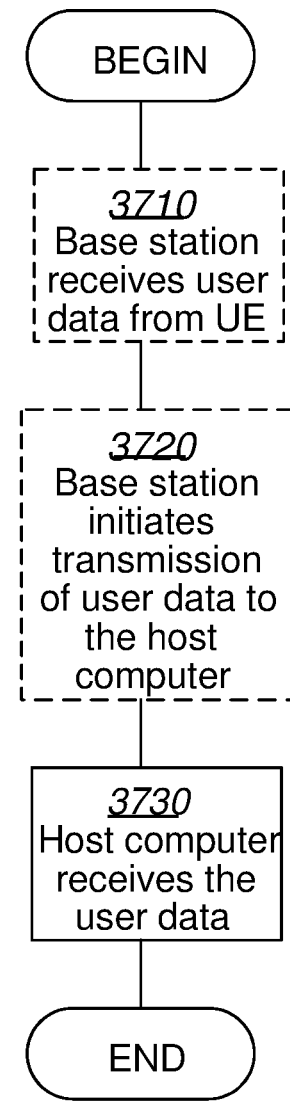
Fig. 21
Fig. 22

FIRST UNIT, SECOND UNIT AND METHODS IN A WIRELESS COMMUNICATIONS NETWORK

CROSS-REFERENCE TO RELATED APPLICATIONS

This application is a Submission Under 35 U.S.C. § 371 for U.S. National Stage Patent Application of International Application No.: PCT/SE2019/050309, filed Apr. 4, 2019 entitled "FIRST UNIT, SECOND UNIT AND METHODS IN A WIRELESS COMMUNICATIONS NETWORK," which claims priority to U.S. Provisional Application No. 62/653,597, filed Apr. 6, 2018, the entireties of both of which are incorporated herein by reference.

TECHNICAL FIELD

Embodiments herein relate to a first unit, a second unit and methods therein. In some aspects, they relate to handling a connection between the first unit and multiple second units in the wireless communications network.

BACKGROUND

In a typical wireless communication network, wireless devices, also known as wireless communication devices, mobile stations, stations (STA) and/or User Equipments (UE), communicate via a Local Area Network such as a Wi-Fi network or a Radio Access Network (RAN) to one or more core networks (CN). The RAN covers a geographical area which is divided into service areas or cell areas, which may also be referred to as a beam or a beam group, with each service area or cell area being served by a radio network node such as a radio access node e.g., a Wi-Fi access point or a radio base station (RBS), which in some networks may also be denoted, for example, a NodeB, eNodeB (eNB), or gNB as denoted in 5G. A service area or cell area is a geographical area where radio coverage is provided by the radio network node. The radio network node communicates over an air interface operating on radio frequencies with the wireless device within range of the radio network node.

Specifications for the Evolved Packet System (EPS), also called a Fourth Generation (4G) network, have been completed within the 3rd Generation Partnership Project (3GPP) and this work continues in the coming 3GPP releases, for example to specify a Fifth Generation (5G) network also referred to as 5G New Radio (NR). The EPS comprises the Evolved Universal Terrestrial Radio Access Network (E-UTRAN), also known as the Long Term Evolution (LTE) radio access network, and the Evolved Packet Core (EPC), also known as System Architecture Evolution (SAE) core network. E-UTRAN/LTE is a variant of a 3GPP radio access network wherein the radio network nodes are directly connected to the EPC core network rather than to RNCs used in 3G networks. In general, in E-UTRAN/LTE the functions of a 3G RNC are distributed between the radio network nodes, e.g. eNodeBs in LTE, and the core network. As such, the RAN of an EPS has an essentially "flat" architecture comprising radio network nodes connected directly to one or more core networks, i.e. they are not connected to RNCs. To compensate for that, the E-UTRAN specification defines a direct interface between the radio network nodes, this interface being denoted the X2 interface.

Multi-antenna techniques may significantly increase the data rates and reliability of a wireless communication system. The performance is in particular improved if both the transmitter and the receiver are equipped with multiple antennas, which results in a Multiple-Input Multiple-Output (MIMO) communication channel. Such systems and/or related techniques are commonly referred to as MIMO.

The current 5G RAN overall architecture is described in 3GPP TS38.401 and can be seen in FIG. 1. The New Generation (NG) architecture may be further described as follows:

The NG-RAN comprises a set of gNBs connected to the 5GC through the NG.

A gNB supports FDD mode, TDD mode or dual mode operation.

gNBs may be interconnected through the Xn.

A gNB may comprise a gNB-Controlling Unit (CU) and gNB-DUs.

A gNB-CU and a gNB-Distributed Unit (DU) are connected via F1 logical interface.

One gNB-DU may only be connected to one gNB-CU.

NG, Xn and F1 are logical interfaces.

NG is the abbreviation for the interface between 5G CN and NG-RAN

F1 is the interface between a gNB-CU and a gNB-DU (or more simple CU and DU)

Xn is the interface between gNBs (i.e. pluralis)

Xn-C is the Xn Control Plane interface between gNBs

Xn-U is the Xn User Plane interface between gNBs

For NG-RAN, the NG and Xn-C interfaces for a gNB comprising a gNB-CU and gNB-DUs, terminate in the gNB-CU.

S1-U is the user plane interface between the EPC and a eNB or EPC and a SgNB (Secondary gNB meaning EN-DC)

X2-C is the control plane interface between a eNB and a gNB

X2-U is the user plane interface between a eNB and a gNB

A gNB-CU may be split into one gNB-CU-CP and one or more gNB-CU-UPs

F1-U is the user plane interface between gNB-CU-UP and a gNB-DU

E1 is the control plane interface between CU-CP and CU-UP within one gNB

For E-UTRAN New Radio-Dual Connectivity (EN-DC), the S1-U and X2-C interfaces for a gNB comprising a gNB-CU and gNB-DUs, terminate in the gNB-CU. The gNB-CU and connected gNB-DUs are only visible to other gNBs and the 5GC as a gNB.

The NG-RAN is layered into a Radio Network Layer (RNL) and a Transport Network Layer (TNL). The NG-RAN architecture, i.e. the NG-RAN logical nodes and interfaces between them, is defined as part of the RNL. For each NG-RAN interface (NG, Xn, F1) the related TNL protocol and the functionality are specified. The TNL provides services for user plane transport and signalling transport. In NG-Flex configuration, each gNB is connected to all AMFs within an AMF Region. The AMF Region is defined in 3GPP TS 23.501.

FIG. 2 depicts Control (C)-Plane connectivity for EN-DC and FIG. 3 depicts User (U)-Plane connectivity for EN-DC.

For the 5G system, a connectivity option is specified which foresees dual connectivity between a node providing E-UTRA resources, LTE eNB in the FIGS. 2 and 3, and a node providing NR resources, gNB in FIGS. 2 and 3. This connectivity option is called "option 3", as per 3GPP TR 38.801 and foresees connectivity from RAN nodes towards a 4G Core Network by means of the S1 interface. It may also be indicated as EN-DC, E-UTRAN-NR Dual Connectivity.

S1 interface in LTE is used between eNBs and the EPC. The interface between the LTE eNB and gNB is an X2 interface.

Early deployments of NR and LTE networks will be characterized by tight integration. One of the key features will be Multi-Radio Access Technology Dual Connectivity (MR-DC), to deliver enhanced end-user bit rate. In MR-DC, both LTE and NR concurrently provide radio resources towards a UE. In one of the possible options for MR-DC, referred to as "Option 3" in 3GPP discussions, the LTE eNB acts as master node also referred to as CP anchor, and the NR gNB acts as secondary node providing additional UP resources.

An LTE eNB and an NR gNB may also be connected via a so called Xn interface. In this case the core network involved in serving a UE via the eNB and/or gNB is called 5G Core Network (5GC) or NG Core Network (NGC). Cases of dual connectivity between an eNB and a gNB may be envisaged in this architecture too. The master node may be the eNB or the gNB. FIGS. 4a and 4b show a case where the eNB is the master node, in what is called Option 7, as per TR38.801.

SUMMARY

An object of embodiments herein is to improve the performance of a wireless communications network.

According to an aspect of embodiments herein, the object is achieved by a method performed by a first unit for handling a connection between the first unit and multiple second units in a wireless communications network. The first unit obtains 601 from each of the multiple second units a respective indication of which one or more version of NR User plane protocol, NR-U, it supports. The first unit decides 602 which version of NR-U that is possible to use for the connection based on the indications received from the multiple second units.

According to another aspect of embodiments herein, the object is achieved by a method performed by a second unit for handling a between the first unit and multiple second units in a wireless communications network. The second unit sends an indication to the first unit. The indication indicates which one or more versions of NR User plane protocol, NR-U, the second unit supports. The second unit then receives from the first unit, an indication of a decided version of NR-U that is possible to use for the connection. The version of NR-U is decided based on the sent indication of which one or more versions of NR-U the second unit supports together with which one or more versions of NR-U that one or more other second units supports.

According to a further aspect of embodiments herein, the object is achieved by a first unit for handling a connection between the first unit and multiple second units in a wireless communications network. The first unit is configured to:
  Obtain from each of the multiple second units a respective indication of which one or more version of NR User plane protocol, NR-U, it supports, and
  decide which version of NR-U that is possible to use for the connection based on the indications received from the multiple second units.

According to a yet further aspect of embodiments herein, the object is achieved a second unit for handling a connection between the first unit the deciding unit and multiple second units in a wireless communications network. The second unit is configured to:
  Send to the first unit, an indication of which one or more version of NR User plane protocol, NR-U, the second unit supports, and
  receive from the first unit, an indication of a decided version of NR-U that is possible to use for the connection, which version of NR-U is decided based on the sent indication of which one or more versions of NR-U the second unit supports together with which one or more versions of NR-U that one or more other second units supports.

BRIEF DESCRIPTION OF THE FIGURES

FIG. 6 is a flowchart depicting embodiments of a method in a first unit.
FIG. 7 is a flowchart depicting embodiments of a method in a second unit.
FIG. 10 is a schematic diagram illustrating an embodiment.
FIG. 11 is a schematic diagram illustrating an embodiment.
FIG. 13 is a schematic diagram illustrating an embodiment.
FIG. 14 is a schematic diagram illustrating an embodiment.
FIGS. 19-22 are flowcharts illustrating methods implemented in a communication system including a host computer, a base station and a user equipment.

DETAILED DESCRIPTION

As a part of developing embodiments herein the inventors identified a problem which first will be discussed.

In Dual- or Multi-Connectivity scenarios, henceforth referred to collectively as DC, data to a UE may be sent to at least two or more Distributed Units (DU) connected to a Controlling Unit (CU) or to a DU and an eNB, as per FIGS. 2, 3, 4a and 4b. It should be noted that the node hosting the Packet Data Convergence Protocol (PDCP) layer, e.g. the CU, may be one unit or may be both logically and physically split into two separate functions that handle user plane and control data separately. The user plane connection between the node hosting the PDCP and the node hosting lower layers, e.g. the DU, is the NR user plane protocol as defined in 3GPP specification NR user plane, TS 38.425, (Reference 1) version V15.0.0. In summary, the NR user plane protocol is used over the F1-U interface, the X2-U interface and the X2-C interface. 3GPP TS 38.425 is a version controlled and the current latest version at the time of writing is 15.0.0.

3GPP Release 15.0.0 is the first release of 3GPP specification NR user plane, TS 38.425, version V15.0.0 and the scope of the specification is expected to increase with new functionality added in each subsequent specification release. Some of these additions will be optional while others mandatory to support. Consequently, a node supporting lower layers, e.g. the DU, that supports an earlier release may misinterpret some fields in the header structure of a UP PDU formatted according to a later release and this can cause problems ranging all the way from data being lost as discarded, erroneous interpretation of data and header information to deadlock situations. This means that it is important to ensure that a transmitting node uses a protocol version that is compatible with a receiving node. Note that this does not automatically mean that both nodes need to run the same version of the protocol but that data transmitted between the nodes must use field and header structures that both nodes support and interpret in the correct way.

An object of embodiments herein may therefore be to improve the performance in a wireless communications network.

Example embodiments herein relate to 5G NR user plane protocol version handling, e.g. to interface protocol version handling, in the new 5G NR radio with specific focus on the user plane protocol.

Embodiments herein enable to add the capability to convey which protocol versions are supported utilizing suitable information elements and that this information may be sent between a CU and a DU using either higher layer negotiation or in-band PDU signaling as defined in the 3GPP specification NR user plane protocol, TS 38.425 (Reference 1). This makes it possible for a transmitting node to use a protocol version that is compatible with a receiving node. Reference 1 when used herein means NR user plane.

Figure 1:
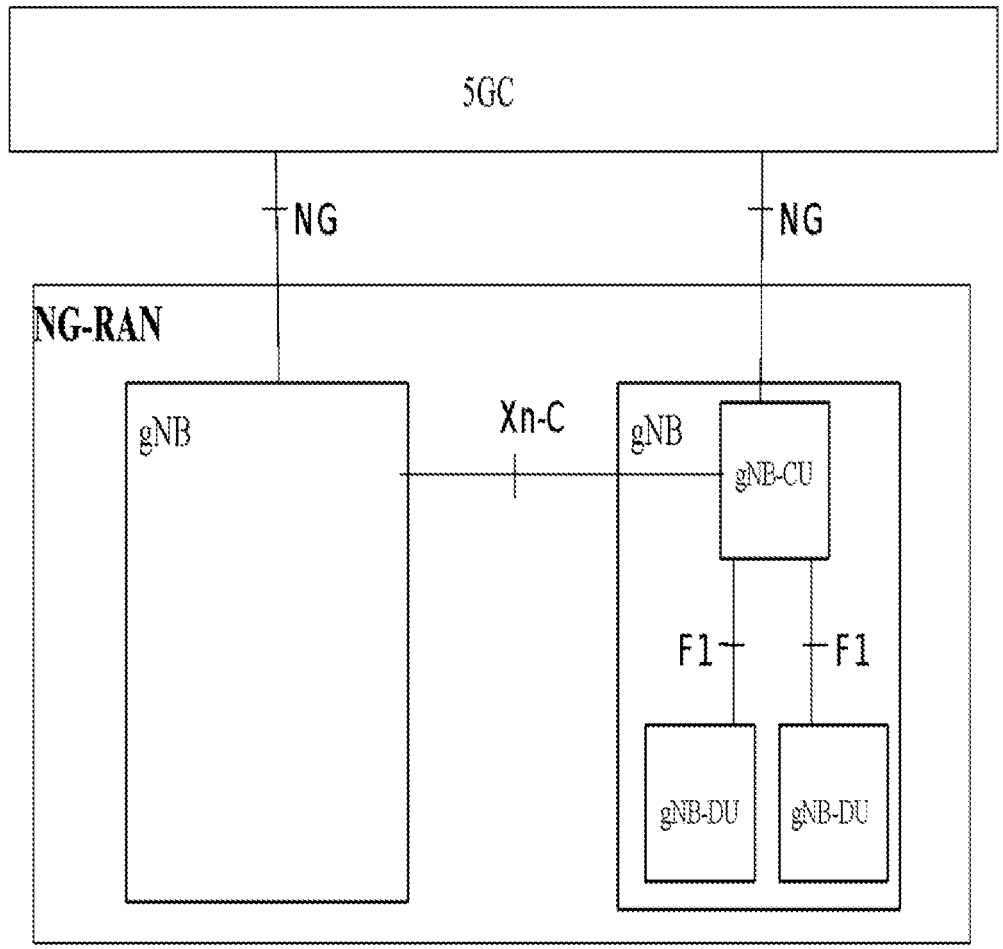
FIG. 1 is a schematic block diagram illustrating prior art.
Figure 2:
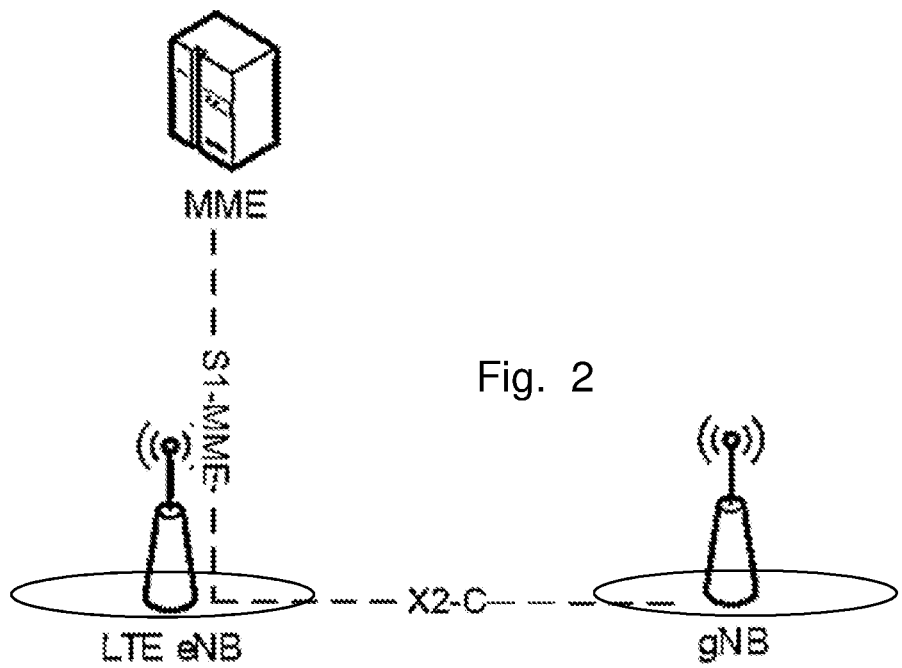
FIG. 2 is a schematic block diagram illustrating prior art.
Figure 3:
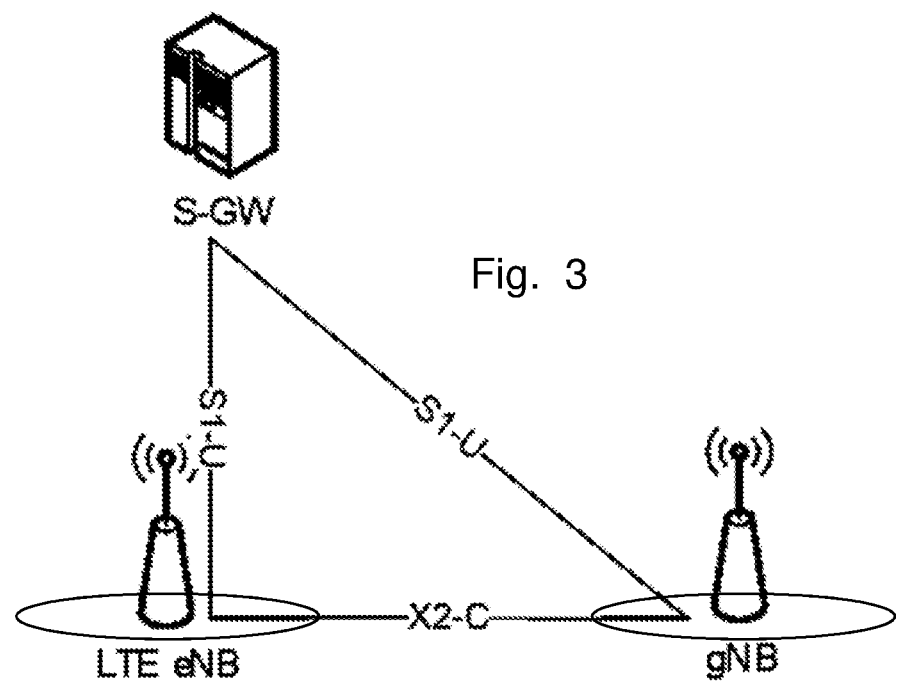
FIG. 3 is a schematic block diagram illustrating prior art.
Figure 4B:
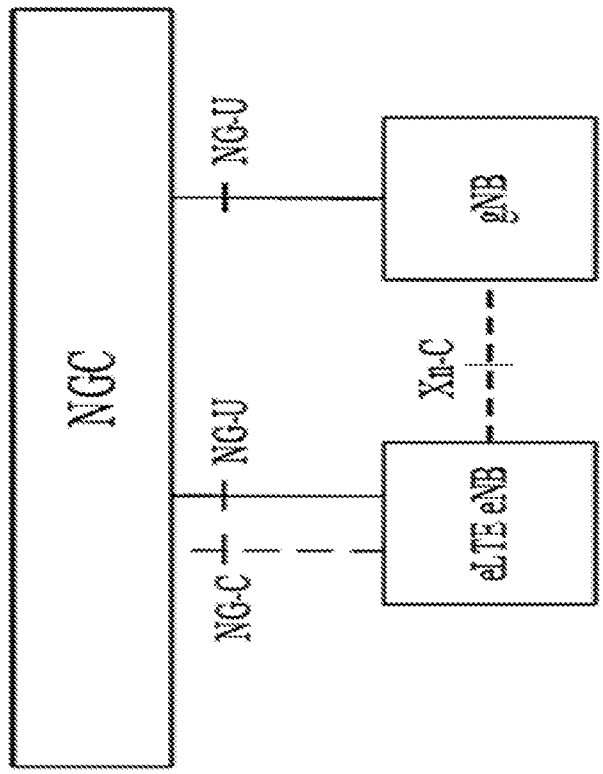
FIG. 4 is a schematic block diagram illustrating prior art.
Figure 4A:
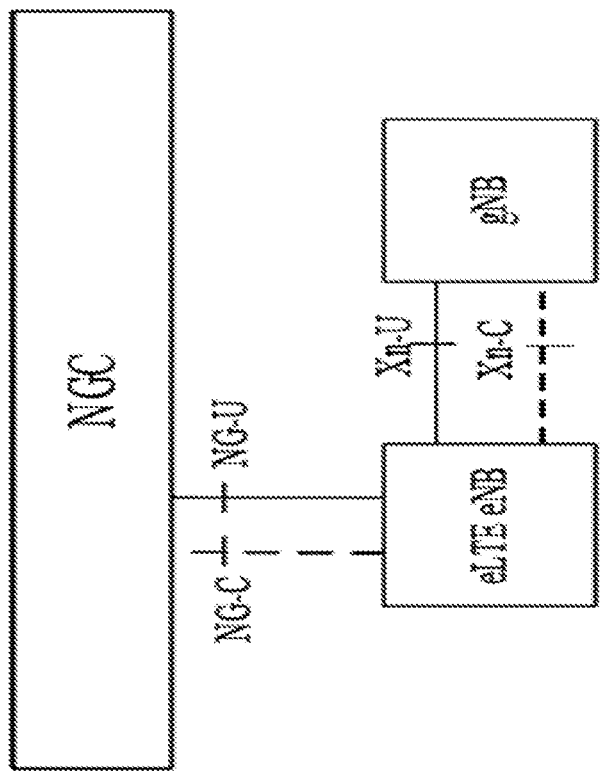
Figure 5A:
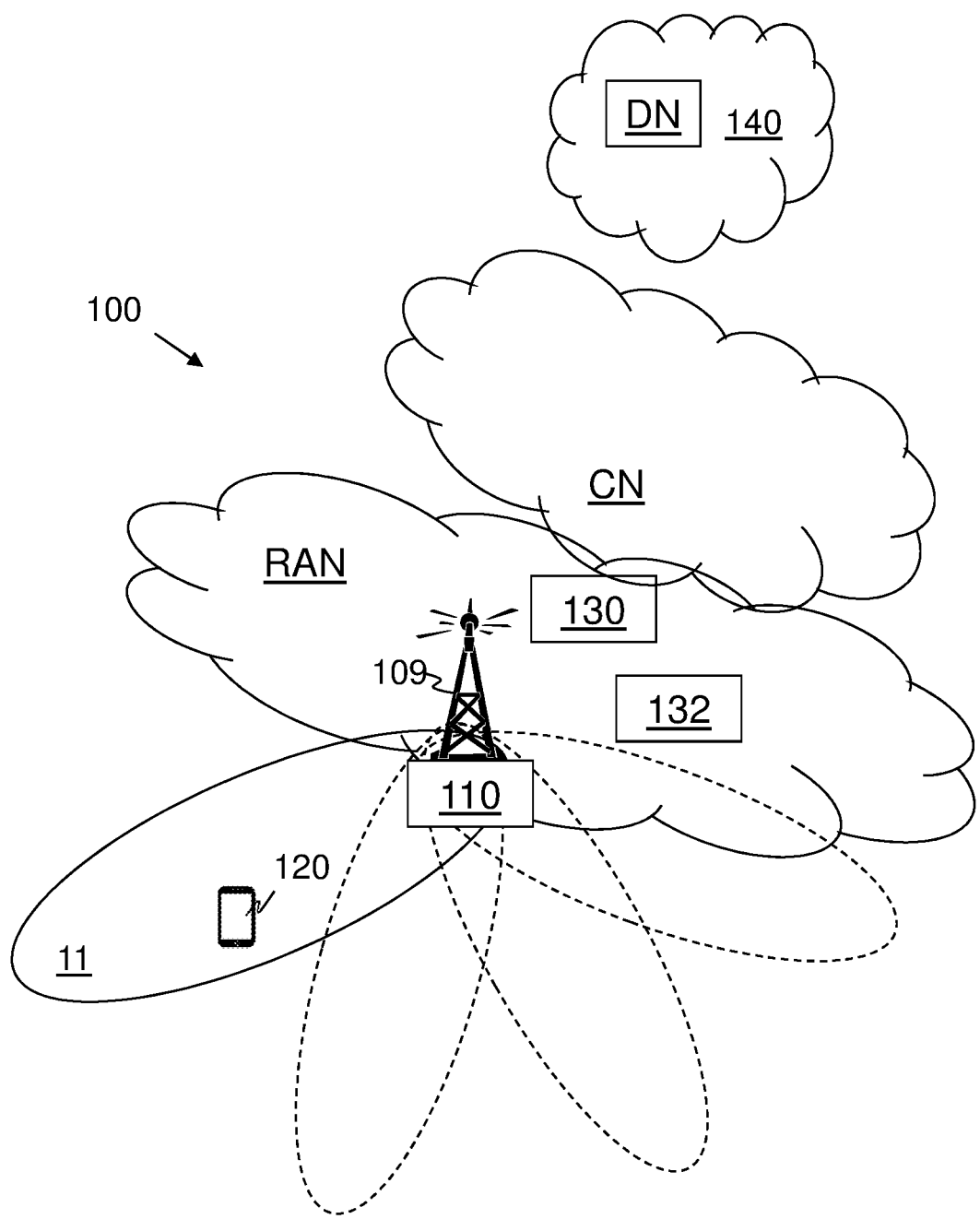
FIG. 5a is a schematic block diagram illustrating embodiments of a wireless communications network.

Embodiments herein relate to wireless communication networks in general. FIG. 5a is a schematic overview depicting a wireless communications network 100. The wireless communications network 100 comprises one or more RANs and one or more CNs. The wireless communications network 100 may use a number of different technologies, such as Wi-Fi, Long Term Evolution (LTE), LTE-Advanced, 5G, New Radio (NR), Wideband Code Division Multiple Access (WCDMA), Global System for Mobile communications/enhanced Data rate for GSM Evolution (GSM/EDGE), Worldwide Interoperability for Microwave Access (WiMax), or Ultra Mobile Broadband (UMB), just to mention a few possible implementations. Embodiments herein relate to recent technology trends that are of particular interest in a 5G context, however, embodiments are also applicable in further development of the existing wireless communication systems such as e.g. WCDMA and LTE.

In the wireless communication network 100, UEs such as a UE 120 operate. The UE 120 may be a mobile station, a non-access point (non-AP) STA, a STA, a wireless terminals, and is capable to communicate via one or more Access Networks (AN), e.g. RAN, to one or more core networks (CN). It should be understood by the skilled in the art that "wireless device" is a non-limiting term which means any terminal, wireless communication terminal, user equipment, Machine Type Communication (MTC) device, Device to Device (D2D) terminal, or node e.g. smart phone, laptop, mobile phone, sensor, relay, mobile tablets or even a small base station communicating within a cell.

The wireless communications network 100 comprises a radio network node 109 providing radio coverage over a geographical area, such as a service area 11, which may also be referred to as a beam or a beam group of a first radio access technology (RAT), such as 5G, LTE, Wi-Fi or similar. The radio network node 109 may be a NG-RAN node, transmission and reception point e.g. a base station, a radio access network node such as a Wireless Local Area Network (WLAN) access point or an Access Point Station (AP STA), an access controller, a base station, e.g. a radio base station such as a NodeB, an evolved Node B (eNB, eNode B), a gNB, a base transceiver station, a radio remote unit, an Access Point Base Station, a base station router, a transmission arrangement of a radio base station, a stand-alone access point or any other network unit capable of communicating with a wireless device within the service area served by the network node 110 depending e.g. on the first radio access technology and terminology used.

Multiple DUs where only one, a DU 110, is depicted in FIG. 5a, operate in the wireless communications network 100. The DU 110 may be comprised in the network node 109. The DU 110 may be or comprise a Radio Link Control (RLC) entity. RLC is one of the protocols to secure good performance over a radio interface.

The radio network node 109 may be referred to as a serving radio network node and communicates with the UE 120 by means of the DU 110 with Downlink (DL) transmissions to the UE 120 and Uplink (UL) transmissions from the UE 120.

Figure 5B:
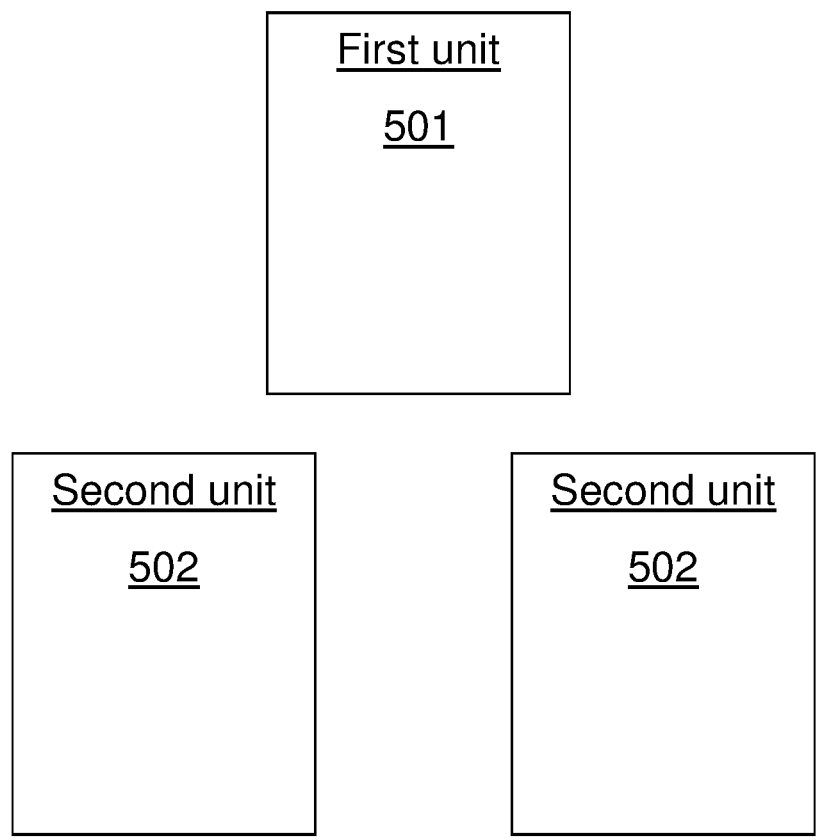
FIG. 5b is a schematic block diagram illustrating embodiments of a wireless communications network.

A number of units are depicted in FIG. 5a and FIG. 5b such as e.g. a first unit 130 501 and one or more second units 132, 502 operate in the wireless communications network 100. The first unit 130 may in some embodiments be comprised in the network node 109. The first unit 501, 130 and the second unit 502, 132 may be or may comprise a PDCP entity. A PDCP entity when used herein is a functional entity handling ciphering, integrity protection that terminates the PDCP protocol.

The first unit 130, 501 may in some embodiments be any one out of a CU and a DU and also the second units 132 may be any one out of a CU and a DU. Other alternatives will be escribed below.

The first and second units 501, 130, 502, 132 and the DUs may be used for functional split. In some embodiments, the CUs such as the first unit 501, 130 and the second unit 502, 132 terminate PDCP while the DUs such as the DU 110 implement protocol layers below PDCP.

In some embodiments then first unit 501, 130 and the DU 110 are separated by a midhaul interface such as an F1-U interface. Other alternatives will be escribed below.

Methods herein may be performed by the first unit 501 and the second units 502. As an alternative, any Distributed Node (DN) and functionality, e.g. comprised in a cloud 140 as shown in FIG. 5a, may be used for performing or partly performing the methods.

Embodiments herein are especially beneficial in a cloud implementation where the network nodes are physically separated from each other. For example, in a virtualized environment the DU's serving a UE may be separated both physically and in the frequency domain meaning the transmission characteristics for each separate DU may vary significantly over time and it is therefore especially important that the control of data duplication is as efficient as possible in such a scenario.

E.g. a Centralized Unit User Plane (CU-UP) running on a PDCP entity such as e.g. the first unit 501, 130 may be realized as a cloud network function. A CU-UP when used herein is e.g. a cloud function or implemented on a radio node, possibly co-located with one or more DUs.

Some example embodiments in this disclosure outlines suitable methods to assess which NR User plane protocol versions, such as reference 1 versions, the connected nodes, such as the first unit 501 and the multiple second units 502, support and also methods to convey this information either by utilizing in-band user plane signaling or by relying on higher layer control plane control in order to ensure that compatible NR user plane versions such as reference 1 versions information fields and header structures are used for the duration of the connection. In-band user plane signaling when used herein means Information Elements carried in e.g. GTP-U, X2-U, Xn-U or F1-U protocols. Higher layer control plane control when used herein means Information Elements carried in e.g. F1-C, X2-AP, E1 or RRC signaling protocols.

Examples of embodiments herein focus the description on a pure 5G solution, but all included embodiments are applicable also for EN-DC.

Embodiments herein may e.g. provide the following advantages:

It is an advantage that suitable version information is exchanged between the involved nodes such as the first unit 501 and the multiple second units 502 as input to a decision regarding which version of NR-U also referred to as reference 1 shall be used to connect DU's to the CU. Embodiments herein consequently significantly reduces the risk of protocol mismatches resulting in misinterpreted header fields or data being discarded and lost, erroneous interpretation of data and/or header information and deadlock situations. Embodiments herein utilizing in-band NR user plane signaling also ensures that the version handling information may be conveyed expediently and with minimal overhead compared to other more time consuming procedures like Radio Resource Signaling (RRC) procedures.

The functionality outlined in this disclosure will be especially beneficial in 5G DC scenarios involving multiple DU's from multiple different vendors since the more nodes and different vendors involved the more important it is that the header structures and Information Elements (IE's) used are understood and interpreted in the right way by all the nodes.

FIG. 6 shows an example method performed by the first unit 501 for handling a connection such as an upcoming connection between the first unit 501 and multiple second units 502 in the wireless communications network 100. The method may comprise any of the actions below. See also FIG. 5b depicting the first unit 501, and two second units 502. In some embodiments the first unit 501 is represented by a CU, and the multiple second units 502 are represented by one or more DUs. In some alternative embodiments, the first unit 501 is represented by a CU-CP, and the multiple second units 502 are represented by a CU-UP, and one or more DUs. In some other alternative embodiments, the first unit 501 is represented by a master node, and the multiple second units 502 are represented by multiple secondary nodes. In some embodiments, the first unit 501 is represented by a CU-UP.

In Action 601, the first unit 501 obtains from each of the multiple second units 502, a respective indication of which one or more version of NR-U, it supports. NR-U is also referred to as Reference 1 herein. The first unit 501 thus collects information about supported versions of NR-U from the multiple second units 502.

Action 602. The first unit 501 then decides which version of NR-U that is possible to use for the connection based on the indications received from the multiple second units 502. This may be decided by comparing the versions supported in the connected units and choosing the highest version supported by both communicating units.

In optional Action 603, the first unit 501 sends to each respective multiple second units 502, an indication of the decided version of NR-U that is possible to use for the connection. This is to inform the respective second unit 502 about which version to use.

Some further alternative embodiments are described below.

FIG. 7 shows an example method performed by one of the multiple a second units 502, e.g. for handling a connection such as an upcoming connection between the first unit 501, and multiple second units 502 in the wireless communications network 100. The method may comprise any of the actions below. See also FIG. 5b depicting the first unit 501, and two second units 502.

As mentioned above, in some embodiments, the first unit 501 is represented by a CU, and the second unit 502 is represented by a DU. In some alternative embodiments, the first unit 501 is represented by a CU-CP, and the second unit 502 is represented by any one out of a CU-UP, and a DU. In some other alternative embodiments, the first unit 501 is represented by a master node, and the second unit 502 is represented by a secondary node. In some embodiments, the first unit 501 is represented by a CU-UP.

In Action 701, the second unit 502 sends an indication to the first unit 501. The indication indicates which one or more version of NR-U the second unit 502 supports.

In Action 702, the second unit 502 receives another indication, from the first unit 501. The other indication indicates a decided version of NR-U that is possible to use for the connection. The version of NR-U is decided based on the sent indication of which one or more versions of NR-U the second unit 502 supports together with which one or more versions of NR-U that one or more other second units 502 supports.

Overview

Figure 8:
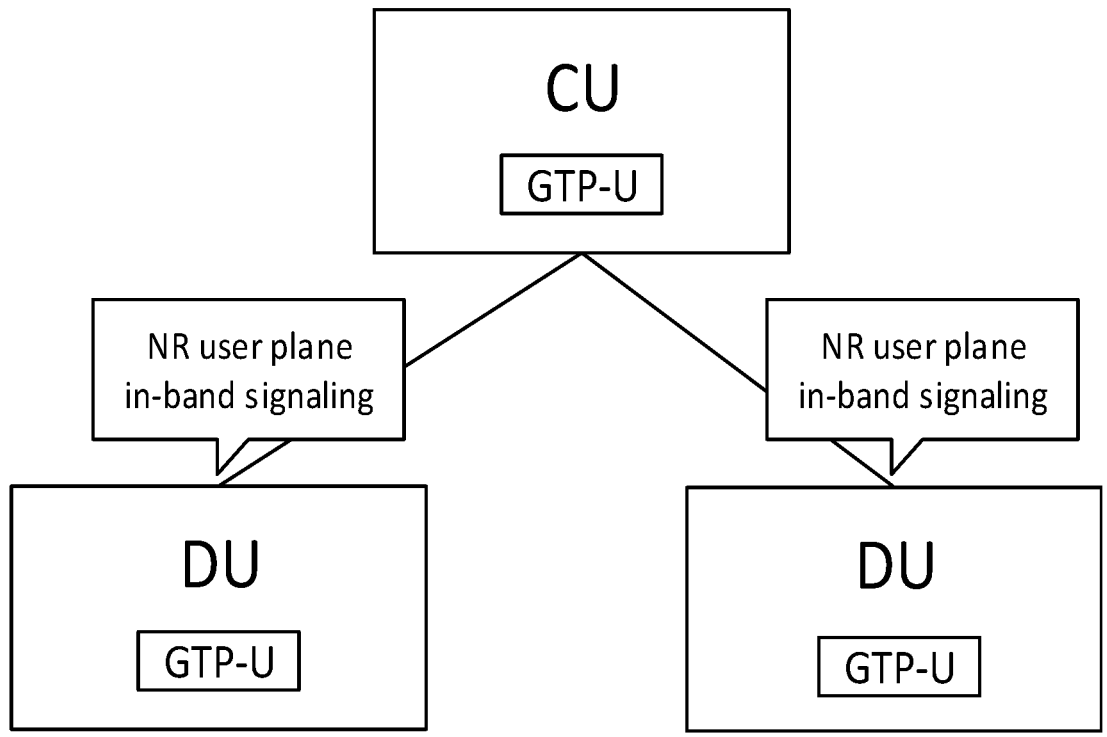
FIG. 8 is a schematic block diagram illustrating embodiments of a wireless communications network.

See FIG. 8. The first step in determining what type of protocol header structure 35 and IE's that can be used over the F1-U interface may be to determine which NR user plane versions such as reference 1 versions all the nodes and/or units such as the first unit 501 and the second units 502, involved in the connection to the UE 120 support. When this information has been collected by the first unit 501 from the second units 502 and processed in an appropriate node, a decision will be taken by the first node 502 on what reference 1 protocol versions, i.e. NR-U versions should be used on each connection. Note that this may mean that different DUs are connected to the CU using the same or different versions of the NR user plane such as reference 1.

It should also be noted that the usage of NR user plane versions such as reference 1 versions may need not to be static: Even if a certain version or versions is selected at the set-up of the connection, the UE 120 may during the call move to another location where it gets connected to other first and second units, e.g. another DU or a number of DU's that support other versions of NR user plane such as versions of reference 1 meaning that the version control and handling may be needed to be continuously monitored during a call to avoid potential problems of misread or erroneously interpreted user plane PDU's as outlined above.

The methods described herein are extendable to all the cases where the NR user plane protocol is applied. Namely these may be cases where the node hosting the PDCP protocol is the network node 109 such as eNB, or a gNB-CU, while the node hosting lower layers may be the network node 109 such as an eNB or a gNB-DU. It should be noted that the network node 109 such as an eNB may also be split in a node hosting user plane function, i.e. an eNB-CU-UP and a node hosting control plane functions, i.e. an eNB-CU-CP. The network node 109 such as the eNB may also have an eNB-DU, in which case the NR user plane protocol may be used also between the eNB-CU (eNB-CU-UP) and eNB-DU. Therefore, the methods herein also apply to the interfaces connecting an eNB-CU to an eNB-DU. For reasons of simplicity the embodiments describe the methods with respect to a gNB-CU hosting PDCP and a gNB-DU hosting lower layers.

As mentioned above, the first unit 501 may be represented by a CU-CP, and the second units 502 may be represented by any one out of a CU-UP, and a DU.

In a deployment where a CU is split into a user plane part (CU-UP) and a control plane part (CU-CP) connected over a standard interface, i.e., E1 interface as specified in TS 38.46x, the versions supported by the CU-UP may be sent to the CU-CP. Meanwhile, the versions of the NR user plane supported by the DU such as the second unit 502 may be conveyed from the DU to the CU-CP such as the first unit 501, e.g., over the standard F1 interface defined in 3GPP TS 38.473. The CU-CP such as the first unit 501 may then decide which protocol version to use for each Data Radio Bearer (DRB) and inform the CU-UP such as the second unit 502 and the DU such as the second unit 502 during the bearer setup procedures over the E1 and F1 interfaces.

As mentioned above, the first unit 501 may be represented by a CU-CP, and the second units 502 may be represented by any one out of a CU-UP, and a DU. As an alternative, the first unit 501 may be represented by CU-UP, and the second unit 502 is represented by any one out of a CU-CP and a DU.

Alternatively, the CU-CP, such as the second unit 502 may convey the information about the protocol versions supported at the DU such as the second unit 502 to the CU-UP such as the first unit 501. Based on this information, the CU-UP such as the first unit 501 may take the decision on which version to use. The CU-UP such as the first unit 501 or the CU-CP when being the first unit 501 may merge version information for different DUs such as the second units 502 to take decisions. The protocol versions may also be exchanged over the external interfaces (such as X2 and/or Xn) so that the CU-CP such as the first unit 501 or the CU-UP when being the first unit 501 can decide which version to use in case of dual-connectivity between different nodes (eNB and/or NG-RAN node) to take decisions. As an example, the CU-UP such as the second unit 502 may, in a mobility scenario, receive updated version information and based on this add new and/or reconfigure the reference 1 links to new versions.

In the in-band embodiment, this version control information is conveyed via information elements contained in a NR user plane data frame as outlined in section 5 below.

Higher Layer Negotiated Version Control

In this sub-clause it is provided a detailed example of a mechanism for exchanging the supported NR-U version using higher-layer (i.e., control-plane) signalling. As described above at least two possible options are that the (1) CU-CP decides, thus being the first unit 501 which NR-U version to use during DRB setup, or that the (2) CU-UP decides thus being the first unit 501 which NR-U version to use during DRB setup. In the following, it is provided an example in case that the CU-CP decide thus being the first unit 501 the NR-U version. However, similar principle and signalling may also be applied to the case where the CU-UP decides thus being the first unit 501 the NR-U version.

Example: CU-CP Decides, Thus being the First Unit 501, the NR-U Version

Figure 9:
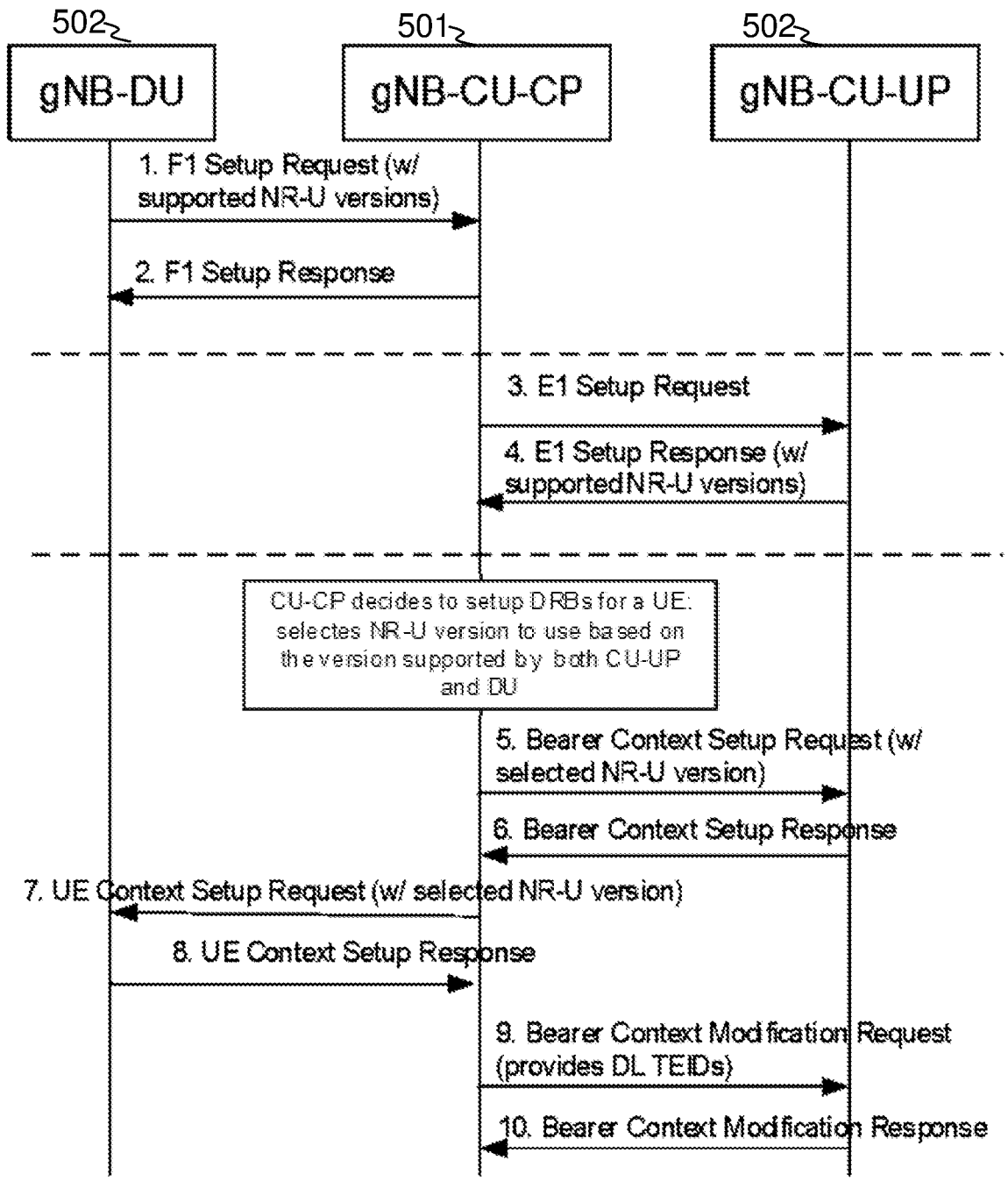
FIG. 9 is a sequence diagram depicting embodiments of a method.

The signalling flow in FIG. 9 shows how to exchange the supported NR-U versions information. This may be carried out using the F1 and E1 setup procedures. The CU-CP, such as the first unit 501 is then aware of the NR-U versions supported by the connected DUs and CU-UPs such as the second units 502. It may for example use this information when selecting which CU-UP to use for serving the UE 120. The CU-CP makes sure that the same version is used by the CU-UP and the DU such as the second units 502 by including the selected NR-U version in the UE Context Setup procedure over F1, towards the DU, and in the Bearer Context Setup procedure over the E1.

FIG. 9 depicts a Call flow showing: (1) exchange of supported NR-U versions during interface setup; (2) exchange of the selected NR-U version for the DRBs during bearer establishment.

Steps 1.-2. The DU, such as one of the second units 502, referred to as gNB-DU in FIG. 9, sends the F1 Setup Request message including a list of supported NR-U versions. The CU-CP, such as the first unit 501, referred to as gNB-CU-CP in FIG. 9, stores this information and sends an F1 Setup Response. Afterwards, the F1-C is operational. F1-C when used herein is the control plane protocol used for communication between a CU and a DU.

The DU, such as one of the second units 502, may provide information about the supported NR-U versions by including the NR-U Version List IE in the F1 Setup Request message as shown in Table I below.

It should be noted that the three last rows in Table I, the last row in Table II and the last row in Table III are what embodiments herein provide to add to the existing procedure.

Alternatively, the DU may also only provide the higher supported NR-U release which implies that all the previous releases are also supported.

Steps 3.-4. The CU-CP sends the E1 Setup Request message. The CU-UP such as another one of the second units 502, referred to as gNB-CU-UP in FIG. 9, replies with the E1 Setup Response messages including a list of supported NR-U versions. The CU-CP stores this information. Afterwards, the E1-C is operational.

Similarly, as the DU over the F1, the CU-UP may provide the list of supported NR-U versions or the latest supported versions over the E1. Similar signalling as the one highlighted in red in table 1 can be sued by the CU-UP over the E1.

Note that the steps 1.-2. and 3.-4. are not necessarily executed in the order shown in FIG. 9. In addition, the following steps may be executed any time after steps 1.-.4 have been completed.

Steps 5.-.6. The CU-CP, such as the first unit 501 ends E1 Bearer Context Setup Request message to CU-UP, such as one of the second units 502, to establish the bearers. The message may include a new IE, namely NR-U version—see example in Table II, that is used to inform the CU-UP about the NR-U version to use for the bearers. The NR-U versions maybe among the one signaled by the CU-UP during the E1 Setup procedure. The CU-UP replies with Bearer Context Setup Response.

Steps 7.-.8. The CU-CP such as the first unit 501 ends F1 UE Context Setup Request message to the DU, such as one of the second units 502, to establish the bearers. The message includes a new IE, namely NR-U version—see example in Table II, that is used to inform the DU about the NR-U version to use for the bearers. The NR-U versions may be among the one signalled by the DU during the F1 Setup procedure. The DU replies with UE Context Setup Response.

Steps 9.-.10. A Bearer Context Modification procedure is performed in which the CU-CP such as the first unit 501 ends the DL TEID of the bearers to the CU-UP such as one of the second units 502.

As an alternative, in step 5 the CU-CP, such as the first unit 501, sends the full list of NR-U versions supported by the DU such as one of the second units 502. The CU-UP, such as one of the second units 502, selects the NR-U version to use and reports with it in step 6. Then, in step 7. the CU-CP will send the NR-U version selected by the CU-UP to the DU.

TABLE II

NR-U version IE included in the UE Context Setup Request and/or Bearer Context Setup Request message.

| IE/Group Name | Presence | Range | IE type and reference | Semantics description | Criticality | Assigned Criticality |
|---|---|---|---|---|---|---|
| NR-U version | M | | 9.3.1.1 | | YES | reject |

In some embodiments the NR-U version may be encoded as a range of numerical values, the indication, for example as in Table III. Each of the numbers corresponds to a version of the NR UP protocol specification, starting from the first numeric value, which corresponds to Release 15.0.0, or a first initiation point of choice. The advantage of this type of encoding is that the specifications and therefore the protocol code do not need to be updated every time a new release of the protocol is available. Once a new release of the protocol is available and supported, the node supporting it will simply signal the next numerical value with respect to the value signaled at support of the previous release. An example of the coding of the version information is show in Table III.

TABLE I

F1 Setup Request including the list of supported NR-U versions.

| IE/Group Name | Presence | Range | IE type and reference | Semantics description | Criticality | Assigned Criticality |
|---|---|---|---|---|---|---|
| Message Type | M | | 9.3.1.1 | | YES | reject |
| Transaction ID | M | | 9.3.1.23 | | YES | reject |
| gNB-DU ID | M | | 9.3.1.9 | | YES | reject |
| gNB-DU Name | O | | PrintableString (SIZE(1 . . . 150, . . . )) | | YES | ignore |
| gNB-DU Served Cells List | | 1 | | List of cells configured in the gNB-DU | YES | reject |
| >gNB-DU Served Cells Item | | 1 . . . <maxCelling NBDU> | | | EACH | reject |
| >>Served Cell Information | M | | 9.3.1.10 | Information about the cells configured in the gNB-DU | — | — |
| >>gNB-DU System Information | O | | 9.3.1.18 | RRC container with system information owned by gNB-DU | — | — |
| NR-U version support | | 1 | | List of NR-U versions supported by the gNB-DU. | YES | reject |
| >NR-U version support Item | | 1 . . . <maxnoofR RCversions> | | | EACH | reject |
| >>NR-U version | M | | ENUMERATED (rel1500, rel1510, . . . ) | NR-U release. | — | — |

TABLE III

NR-U version IE included in the UE Context Setup Request and/or
Bearer Context Setup Request message, encoded as a numerical value ranging from 1
to 128.

| IE/Group Name | Presence | Range | IE type and reference | Semantics description | Criticality | Assigned Criticality |
|---|---|---|---|---|---|---|
| NR-U version | M | | ENUMERATED (1 . . . 128, . . . ) | | YES | reject |

In-Band Version Control

As mentioned above, in some embodiments, the first unit 501 is represented by a CU, and the second unit 502 is represented by a DU.

In the in-band based example the version control function resides in the CU thus being the first unit 501, and uses feedback information from the DU's thus being the multiple second units 502, to determine which reference 1 version to use. In an EN-DC scenario, the version control function resides in the node hosting PDCP, thus being the first unit 501. This information to the CU may be conveyed by any of the protocols connecting the CU and DU but in the in-band embodiment the NR user plane PDU as defined in reference 1 is the method to convey such information. Details related to the signaling is further elaborated below. The supported version information received from the DUs is then used by the first unit 501 to determine which NR user plane versions such as reference 1 protocol versions to use. The version information may then either be present in every UP PDU header sent to the DU or it may be added depending on the needs in specific DL PDU headers, which may either be control or data PDUs.

In an alternative of the example, the version control function is split between all involved nodes. Any node may send its highest NR user plane versions, such as reference 1, protocol version supported thus being one of the second units 502, towards the other connected nodes thus being first units 501. Each node receiving such information shall respond with the minimum commonly supported NR user plane versions, such as reference 1 protocol version out of its own highest supported protocol version and the just received protocol version. This is referred to as a decided version of NR-U that is possible to use for the connection based on the indications received from the multiple second units 502. This hand-shake procedure continues until the exact same protocol version earlier sent to a specific node, is again received from the same node, e.g acknowledged as the highest commonly supported reference 1 protocol version.

When not all the nodes are in direct connection with each other, e.g. the case of two DUs connected to a common CU, but not connected directly between each other, the nodes with more than one connected node, e.g. the CU in this example, shall signal towards all connected nodes the highest commonly supported NR user plane versions, such as reference 1 protocol version shared by itself and its connected nodes and converge towards a single protocol version.

This hand-shake procedure may be re-initiated again at any time, for example when a node is added or removed.

One additional enhancement is that a node may store the highest commonly supported reference 1 protocol version for each connected node and hereby reduce the signaling when new connections are established.

In order to convey the version control information listed below it is proposed that either the existing PDU types are used and the version information added if needed or a new PDU type is added to section 5.5.2 of reference 1. In the current standard, PDU Types 0 and 1 are already used and the new PDU Type Version Control Information can for example use the next available PDU Type which is 2.

A person skilled in the art recognizes that FIGS. 10-14 presented below are only example embodiments based on the current PDU types defined in reference 1 and that other combinations of data fields, spare or reserved bits either in the presently defined or PDU types or added later on into reference 1 may be used to convey the version control information. Yet another alternative is to use currently unused values of the GTP-U "Next Extension Header" field.

It should further be noted that the version control information may be conveyed to or sent from any node able to retrieve information concerning version support. As an example, another PDU Type to be used may be a generic UL PDU Type. As a non-limiting example, the version control information may be sent from the second unit 502 when being a gNB-DU to the first unit 501 when being a gNB-CU or from the second unit 502 when being a gNB-DU to the first unit 501 when being an LTE eNB or from the second unit 502 when being an LTE eNB to the first unit 501 when being a gNB-CU.

Downlink Version Control Information Handling

The Version Control information field in the below examples may be used by the transmitting node such as the second unit 502 to indicate the reference 1 version such as the version of NR-U used to compile the transmitted PDU. This then allows the receiving node such as the first unit 501 to know the header structure and IE rules used by the transmitting node to structure the PDU so that the information contained can be decoded in the correct way.

Examples of DL User Data PDU with Version Control Field.

One example of DL user data PDU with version control field would be to always include the version field. This may either be appended directly under the first octet as in FIG. 10, referred to as version info 1010. or as the last octet before the spare extension.

Another embodiment is to use available spare bits the header referred to as spare 1110 to indicate the presence of a version field so that if this bit is set to 1 it indicates the presence of a version field and if set to 0 then no version field is present, as in FIG. 11.

Figure 12:
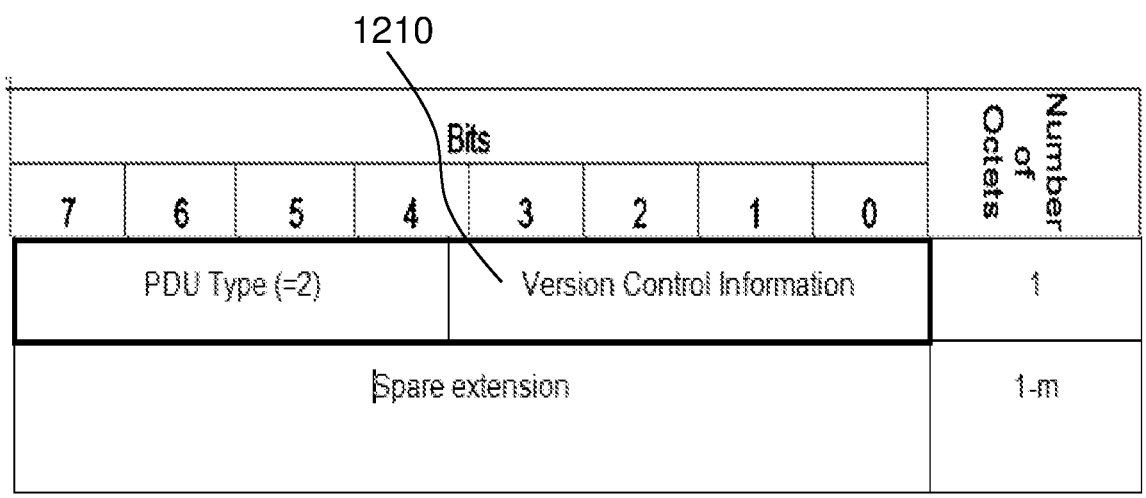
FIG. 12 is a schematic diagram illustrating an embodiment.

In yet another embodiment a new PDU type is defined such as an example frame for new PDU Type 2 Version Information referred to as version control information 1210. FIG. 12 depicts an embodiment where a new PDU type as defined in reference 1 above. Currently the values PDU Type=0 (DL user data) and 1 (DL Data Delivery Status) are defined meaning PDU Type=2 may be used to convey the Version Control Information field. FIG. 12 is Version Control Information (PDU Type 2).

Uplink Version Control Information Handling

Examples of DL Data Delivery Status (DDDS) PDU with version control field.

In some examples one octet of the spare extension 1310 as defined in section 5.5.3.24 in reference 1 is used to convey the Version Control Information field. See FIG. 13.

In another example a new flag bit is introduced in the second octet to indicate the presence of a version information field referred to as version info 1410.

Bit 1 Version info in the second octet is used to indicate the presence of a Version Control Information octet. If Version info is set to 1 then Version Control Information octet is present. If set to 0 then then no Version Control Information octet is present. See FIG. 14.

Handling of Erroneous Version Configurations

Misconfigurations or errors where one or more PDU's are sent to a node that does not support a certain version of reference 1 such as the version of NR-U may be handled in many ways:

An easy example is to introduce a rule that a node that receives a Version Control information field with a non-supported version shall discard the PDU and/or reply with a PDU containing the highest supported version.

Another example is to introduce either a new PDU type or IE that indicates either the highest or a list of Supported Version Information which can then be sent to the transmitting node.

Both these examples may be exemplified by the examples above with the difference that the Version Control information field is substituted with one or more Supported Version Information fields.

Consequently, the above mentioned behavior where a node discards PDU's containing Version Control information fields that it does not support and replies with a PDU indicating highest supported version through a Supported Version Information field or similar may need to be accepted by 3GPP as a mandatory addition to the standard for reference 1.

In another example, at reception of a non-supported protocol version or after both involved nodes, such as the first and second units 501 and 502, have exchanged protocol versions, such as the versions of NR-U, and no convergence is reached regarding a commonly supported version, a procedure may be started over the control plane interfaces, such as over the F1-C between a gNB-DU and a gNB-CU, or over the E1 interface between gNB-CU-UP and gNB-CU-CP. This procedure may flag the non-convergence to a common UP protocol version. The procedure may represent a failure, by which the bearer over which no UP version convergence was reached is removed, or the procedure could simply flag the non-convergence event and leave to the node hosting CP functions for bearer management, e.g. the gNB-CU-CP, to take appropriate actions.

Figure 15:
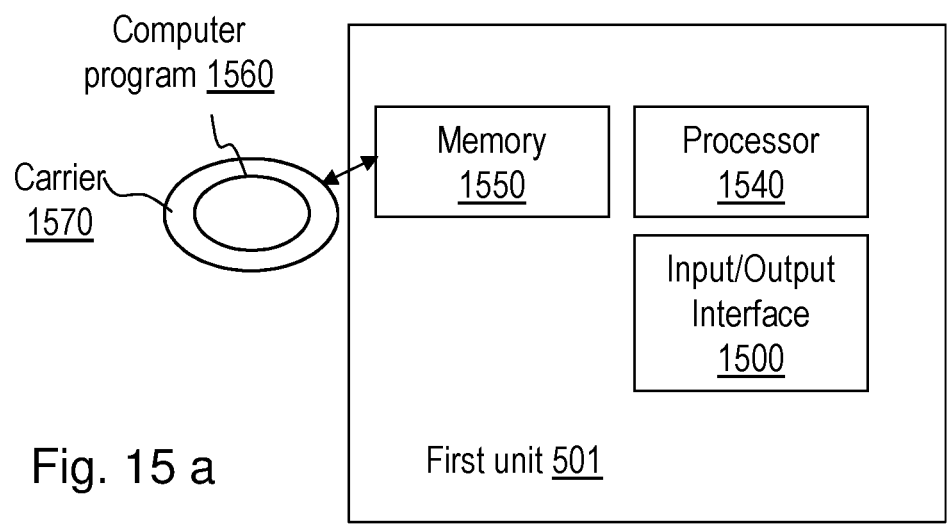
FIGS. 15 a and b are schematic block diagrams illustrating embodiments of a first unit.
Figure 15:
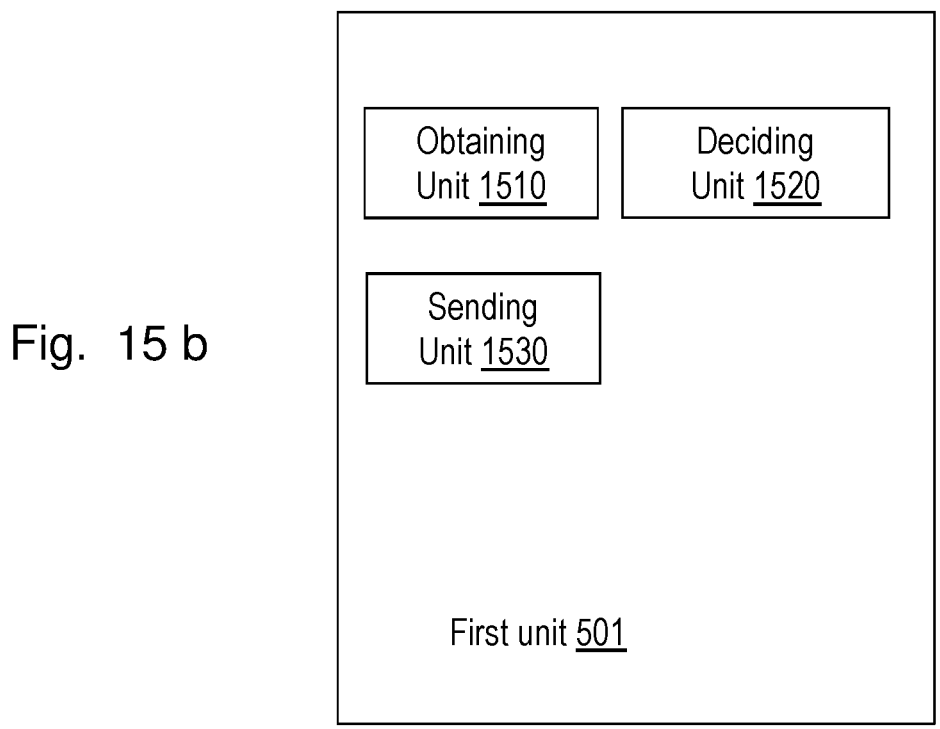

FIGS. 15, *a* and *b* shows an example of arrangements in the first unit 501. The first unit 501 may comprise an obtaining unit 1510, a deciding unit 1520, and a sending unit 1530 as depicted in FIG. 15*b*.

Figure 16:
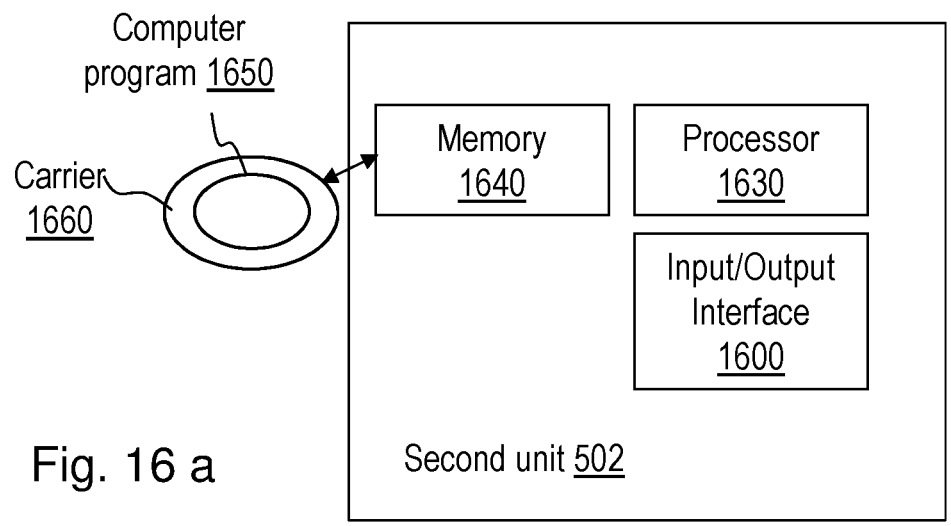
FIGS. 16 a and b are schematic block diagrams illustrating embodiments of a second unit.
Figure 16:
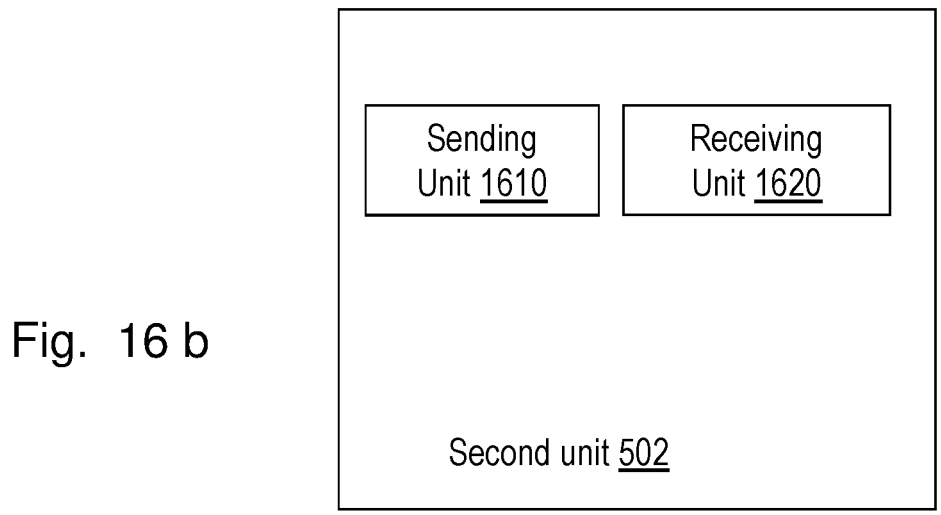

FIGS. 16, *a* and *b* shows an example of arrangements in the second unit 502. The second unit 502 may comprise a sending unit 1610 and a receiving unit 1620 as depicted in FIG. 16*b*.

The respective first unit 501 and second unit 502 may comprise an input and output interface 1500, 1600 configured to communicate with each other. See FIG. 15 *a* and FIG. 16 *a*. The input and output interface may comprise a wireless receiver (not shown) and a wireless transmitter (not shown).

The embodiments herein may be implemented through a respective processor or one or more processors, such as the respective processor 1540, 1630 of a processing circuitry in the respective first unit 501 and second unit 502 depicted in FIGS. 15*a* and 16*a*, together with respective computer program code for performing the functions and actions of the embodiments herein. The program code mentioned above may also be provided as a computer program product, for instance in the form of a data carrier carrying computer program code for performing the embodiments herein when being loaded into the respective first unit 501 and second unit 502. One such carrier may be in the form of a CD ROM disc. It is however feasible with other data carriers such as a memory stick. The computer program code may furthermore be provided as pure program code on a server and downloaded to the respective first unit 501 and second unit 502.

The respective first unit 501 and second unit 502 may further comprise respective a respective memory 1550, 1640 comprising one or more memory units. The memory comprises instructions executable by the processor in the respective first unit 501 and second unit 502.

The memory is arranged to be used to store e.g. versions of NR-U, data, configurations, and applications to perform the methods herein when being executed in the respective first unit 501 and second unit 502.

In some embodiments, a respective computer program 1560, 1650 comprises instructions, which when executed by the at least one processor 1540, 1630, cause the at least one processor of the respective first unit 501 and second unit 502 to perform the actions above.

In some embodiments, a respective carrier 1570, 1660 comprises the respective computer program, wherein the carrier is one of an electronic signal, an optical signal, an electromagnetic signal, a magnetic signal, an electric signal, a radio signal, a microwave signal, or a computer-readable storage medium.

Those skilled in the art will also appreciate that the functional units in the respective first unit 501 and second unit 502, described below may refer to a combination of analog and digital circuits, and/or one or more processors configured with software and/or firmware, e.g. stored in the respective first unit 501 and second unit 502, that when executed by the respective one or more processors such as the processors described above cause the respective at least one processor to perform actions according to any of the actions above. One or more of these processors, as well as the other digital hardware, may be included in a single Application-Specific Integrated Circuitry (ASIC), or several processors and various digital hardware may be distributed among several separate components, whether individually packaged or assembled into a system-on-a-chip (SoC).

When using the word "comprise" or "comprising" it shall be interpreted as non-limiting, i.e. meaning "consist at least of".

The embodiments herein are not limited to the above described preferred embodiments. Various alternatives, modifications and equivalents may be used.

Below, some example embodiments 1-22 are shortly described. See e.g. FIGS. 5*a* and *b*, 6, 7, 15 *a* and *b*, and 16 *a* and *b*.

Embodiment 1. A method performed by a first unit, 501, for handling a connection such as an upcoming connection between the first unit 501 and multiple second units 502 in a wireless communications network 100, the method comprising:

obtaining 601 from each of the multiple second units a respective indication of which one or more version of NR User plane protocol, NR-U, it supports, and deciding 602 which version of NR-U that is possible to use for the connection based on the indications received from the multiple second units 502.

Embodiment 2. The method according to embodiment 1, wherein the first unit 501 is represented by a Central Unit, CU, and the multiple second units 502 are represented by one or more Distributed Units, DUs.

Embodiment 3. The method according to embodiment 1, wherein the first unit 501 is represented by a Centralized Unit Control plane Part, CU-CP, and the multiple second units 502 are represented by a Central Unit User plane Part, CU-UP, and one or more Distributed Units, DUs.

Embodiment 4. The method according to embodiment 1, wherein the first unit 501 is represented by a master node, and the multiple second units 502 are represented by multiple secondary nodes.

Embodiment 5. The method according to any of the embodiments 1-5, further comprising:

sending 603 to each respective multiple second units 502, an indication of the decided version of NR-U that is possible to use for the connection.

Embodiment 6. A computer program comprising instructions, which when executed by a processor, causes the processor to perform actions according to any of the embodiments 1-5.

Embodiment 7. A carrier comprising the computer program of embodiment 6, wherein the carrier is one of an electronic signal, an optical signal, an electromagnetic signal, a magnetic signal, an electric signal, a radio signal, a microwave signal, or a computer-readable storage medium.

Embodiment 8. A method performed by a second unit, 502, for handling a connection such as an upcoming connection between the first unit 501 the deciding unit and multiple second units 502 in a wireless communications network 100, the method comprising:

sending 701 to the first unit 501, an indication of which one or more version of NR User plane protocol, NR-U, the second unit supports, and receiving 702 from the first unit 501, an indication of a decided version of NR-U that is possible to use for the connection, which version of NR-U is decided based on the sent indication of which one or more versions of NR-U the second unit 502 supports together with which one or more versions of NR-U that one or more other second units 502 supports.

Embodiment 9. The method according to embodiment 8, wherein the first unit 501 is represented by a Central Unit, CU, and the second unit 502 is represented by a Distributed Unit, DU.

Embodiment 10. The method according to embodiment 8, wherein the first unit 501 is represented by a Central Unit Control plane Part, CU-CP, and the second unit 502 is represented by any one out of a Centralized Unit User plane Part, CU-UP, a Distributed Unit, DU.

Embodiment 11. The method according to embodiment 8, wherein the first unit 501 is represented by a master node, and the second unit 502 is represented by a secondary node.

Embodiment 12. A computer program comprising instructions, which when executed by a processor, causes the processor to perform actions according to any of the embodiments 8-11.

Embodiment 13. A carrier comprising the computer program of embodiment 12, wherein the carrier is one of an electronic signal, an optical signal, an electromagnetic signal, a magnetic signal, an electric signal, a radio signal, a microwave signal, or a computer-readable storage medium.

Embodiment 14. A first unit 501 for handling a connection such as an upcoming connection between the first unit 501 and multiple second units 502 in a wireless communications network 100, the first unit 501 being configured to:

obtain from each of the multiple second units a respective indication of which one or more version of NR User plane protocol, NR-U, it supports, e.g. by means of an obtaining unit 1510 in the first unit 501, and decide which version of NR-U that is possible to use for the connection based on the indications received from the multiple second units 502, e.g. by means of an deciding unit 1520 in the first unit 501.

Embodiment 15. The first unit 501 according to embodiment 14, wherein the first unit 501 is adapted to be represented by a Central Unit, CU, and the multiple second units 502 are adapted to be represented by one or more Distributed Units, DUs.

Embodiment 16. The first unit 501 according to embodiment 14, wherein the first unit 501 is adapted to be represented by a Centralized Unit Control plane Part, CU-CP, and the multiple second units 502 are adapted to be represented by a Central Unit User plane Part, CU-UP, and one or more Distributed Units, DUs.

Embodiment 17. The first unit 501 according to embodiment 14, wherein the first unit 501 is adapted to be represented by a master node, and the multiple second units 502 are represented by multiple secondary nodes.

Embodiment 18. The first unit 501 according to any of the embodiments 14-17, the first unit 501 further being configured to:

send to each respective multiple second units 502, an indication of the decided version of NR-U that is possible to use for the connection, e.g. by means of a sending unit 1530 in the first unit 501.

19. A second unit 502, for handling a connection such as an upcoming connection between the first unit 501 the deciding unit and multiple second units 502 in a wireless communications network 100, the second unit 502 being configured to:

send to the first unit 501, an indication of which one or more version of NR User plane protocol, NR-U, the second unit supports, e.g. by means of a sending unit 1610 in the second unit 502, and receive from the first unit 501, an indication of a decided version of NR-U that is possible to use for the connection, e.g. by means of a receiving unit 1620 in the second unit 502 which version of NR-U is decided based on the sent indication of which one or more versions of NR-U the second unit 502 supports together with which one or more versions of NR-U that one or more other second units 502 supports.

Embodiment 20. The second unit 502 according to embodiment 8, wherein the first unit 501 is adapted to be represented by a Central Unit, CU, and the second unit 502 is adapted to be represented by a Distributed Unit, DU.

Embodiment 21. The second unit 502 according to embodiment 8, wherein the first unit 501 is adapted to be represented by a Central Unit Control plane Part, CU-CP, and the second unit 502 is adapted to be represented by any one out of a Centralized Unit User plane Part, CU-UP, a Distributed Unit, DU.

Embodiment 22. The second unit 502 according to embodiment 8, wherein the first unit 501 is adapted to be represented by a master node, and the second unit 502 is adapted to be represented by a secondary node.

Embodiment 23. A first unit 501 for handling a connection such as an upcoming connection between the first unit 501 and multiple second units 502 in a wireless communications network 100, the first unit 501 comprising a processor 1540 and a memory 1550 containing instructions executable by the processor whereby the first unit 501 is configured to:

obtain from each of the multiple second units a respective indication of which one or more version of NR User plane protocol, NR-U, it supports, and decide which version of NR-U that is possible to use for the connection based on the indications received from the multiple second units 502.

Embodiment 24. The first unit 501 according to embodiment 23, wherein the first unit 501 is adapted to be represented by a Central Unit, CU, and the multiple second units 502 are adapted to be represented by one or more Distributed Units, DUs.

Embodiment 25. The first unit 501 according to embodiment 23, wherein the first unit 501 is adapted to be represented by a Centralized Unit Control plane Part, CU-CP, and the multiple second units 502 are adapted to be represented by a Central Unit User plane Part, CU-UP, and one or more Distributed Units, DUs.

Embodiment 26. The first unit 501 according to embodiment 23, wherein the first unit 501 is adapted to be represented by a master node, and the multiple second units 502 are represented by multiple secondary nodes.

Embodiment 27. The first unit 501 according to any of the embodiments 23-26, the first unit 501 further being configured to:

send to each respective multiple second units 502, an indication of the decided version of NR-U that is possible to use for the connection.

28. A second unit 502, for handling a connection such as an upcoming connection between the first unit 501 the deciding unit and multiple second units 502 in a wireless communications network 100, the second unit 502 comprising a processor 1630 and a memory 1640 containing instructions executable by the processor whereby the second unit 502 is configured to:

send to the first unit 501, an indication of which one or more version of NR User plane protocol, NR-U, the second unit supports, and receive from the first unit 501, an indication of a decided version of NR-U that is possible to use for the connection, which version of NR-U is decided based on the sent indication of which one or more versions of NR-U the second unit 502 supports together with which one or more versions of NR-U that one or more other second units 502 supports.

Embodiment 29. The second unit 502 according to embodiment 28, wherein the first unit 501 is adapted to be represented by a Central Unit, CU, and the second unit 502 is adapted to be represented by a Distributed Unit, DU.

Embodiment 30. The second unit 502 according to embodiment 28, wherein the first unit 501 is adapted to be represented by a Central Unit Control plane Part, CU-CP, and the second unit 502 is adapted to be represented by any one out of a Centralized Unit User plane Part, CU-UP, a Distributed Unit, DU.

Embodiment 31. The second unit 502 according to embodiment 28, wherein the first unit 501 is adapted to be represented by a master node, and the second unit 502 is adapted to be represented by a secondary node.

Figure 17:
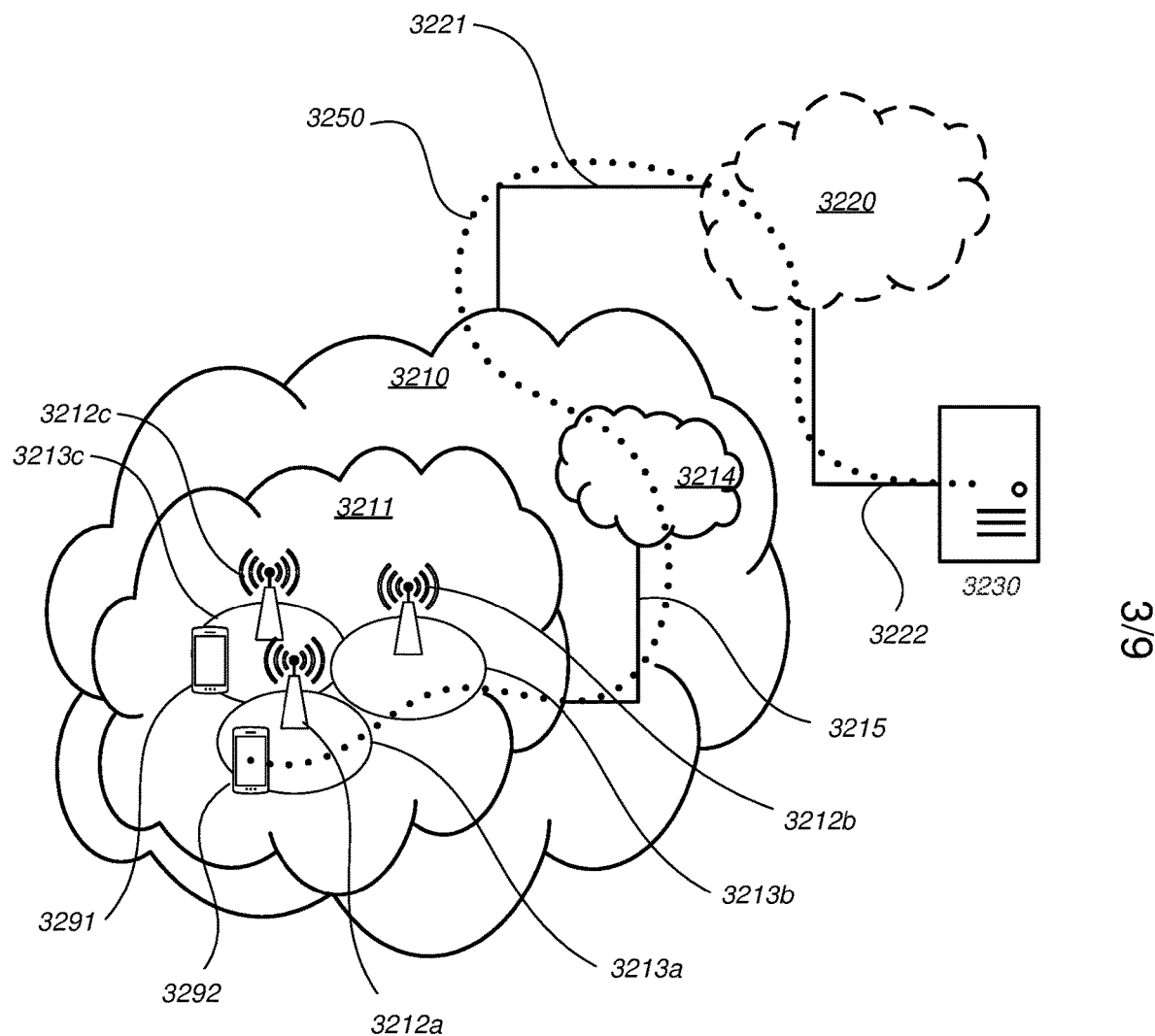
FIG. 17 schematically illustrates a telecommunication network connected via an intermediate network to a host computer.

With reference to FIG. 17, in accordance with an embodiment, a communication system includes a telecommunication network 3210, such as a 3GPP-type cellular network, which comprises an access network 3211, such as a radio access network, and a core network 3214. The access network 3211 comprises a plurality of base stations 3212a, 3212b, 3212c, such as the first unit 501 and the second unit 502, AP STAs NBs, eNBs, gNBs or other types of wireless access points, each defining a corresponding coverage area 3213a, 3213b, 3213c. Each base station 3212a, 3212b, 3212c is connectable to the core network 3214 over a wired or wireless connection 3215. A first user equipment (UE) such as a Non-AP STA 3291 located in coverage area 3213c is configured to wirelessly connect to, or be paged by, the corresponding base station 3212c. A second UE 3292 such as a Non-AP STA in coverage area 3213a is wirelessly connectable to the corresponding base station 3212a. While a plurality of UEs 3291, 3292 are illustrated in this example, the disclosed embodiments are equally applicable to a situation where a sole UE is in the coverage area or where a sole UE is connecting to the corresponding base station 3212.

The telecommunication network 3210 is itself connected to a host computer 3230, which may be embodied in the hardware and/or software of a standalone server, a cloud-implemented server, a distributed server or as processing resources in a server farm. The host computer 3230 may be under the ownership or control of a service provider, or may be operated by the service provider or on behalf of the service provider. The connections 3221, 3222 between the telecommunication network 3210 and the host computer 3230 may extend directly from the core network 3214 to the host computer 3230 or may go via an optional intermediate network 3220. The intermediate network 3220 may be one of, or a combination of more than one of, a public, private or hosted network; the intermediate network 3220, if any, may be a backbone network or the Internet; in particular, the intermediate network 3220 may comprise two or more sub-networks (not shown).

The communication system of FIG. 17 as a whole enables connectivity between one of the connected UEs 3291, 3292 and the host computer 3230. The connectivity may be described as an over-the-top (OTT) connection 3250. The host computer 3230 and the connected UEs 3291, 3292 are configured to communicate data and/or signaling via the OTT connection 3250, using the access network 3211, the core network 3214, any intermediate network 3220 and possible further infrastructure (not shown) as intermediaries. The OTT connection 3250 may be transparent in the sense that the participating communication devices through which the OTT connection 3250 passes are unaware of routing of uplink and downlink communications. For example, a base station 3212 may not or need not be informed about the past routing of an incoming downlink communication with data originating from a host computer 3230 to be forwarded (e.g., handed over) to a connected UE 3291. Similarly, the base station 3212 need not be aware of the future routing of an outgoing uplink communication originating from the UE 3291 towards the host computer 3230.

Example implementations, in accordance with an embodiment, of the UE, base station and host computer discussed in the preceding paragraphs will now be described with reference to FIG. 18. In a communication system 3300, a host computer 3310 comprises hardware 3315 including a communication interface 3316 configured to set up and maintain a wired or wireless connection with an interface of a different communication device of the communication system 3300. The host computer 3310 further comprises processing circuitry 3318, which may have storage and/or processing capabilities. In particular, the processing circuitry 3318 may comprise one or more programmable processors, application-specific integrated circuits, field programmable gate arrays or combinations of these (not shown) adapted to execute instructions. The host computer 3310 further comprises software 3311, which is stored in or accessible by the host computer 3310 and executable by the processing circuitry 3318. The software 3311 includes a host application 3312. The host application 3312 may be operable to provide a service to a remote user, such as a UE 3330 connecting via an OTT connection 3350 terminating at the UE 3330 and the host computer 3310. In providing the service to the remote user, the host application 3312 may provide user data which is transmitted using the OTT connection 3350.

The communication system 3300 further includes a base station 3320 provided in a telecommunication system and comprising hardware 3325 enabling it to communicate with the host computer 3310 and with the UE 3330. The hardware 3325 may include a communication interface 3326 for setting up and maintaining a wired or wireless connection with an interface of a different communication device of the communication system 3300, as well as a radio interface 3327 for setting up and maintaining at least a wireless connection 3370 with a UE 3330 located in a coverage area (not shown in FIG. 18) served by the base station 3320. The communication interface 3326 may be configured to facilitate a connection 3360 to the host computer 3310. The connection 3360 may be direct or it may pass through a core network (not shown in FIG. 18) of the telecommunication system and/or through one or more intermediate networks outside the telecommunication system. In the embodiment shown, the hardware 3325 of the base station 3320 further includes processing circuitry 3328, which may comprise one or more programmable processors, application-specific integrated circuits, field programmable gate arrays or combinations of these (not shown) adapted to execute instructions. The base station 3320 further has software 3321 stored internally or accessible via an external connection.

The communication system 3300 further includes the UE 3330 already referred to. Its hardware 3335 may include a radio interface 3337 configured to set up and maintain a wireless connection 3370 with a base station serving a coverage area in which the UE 3330 is currently located. The hardware 3335 of the UE 3330 further includes processing circuitry 3338, which may comprise one or more programmable processors, application-specific integrated circuits, field programmable gate arrays or combinations of these (not shown) adapted to execute instructions. The UE 3330 further comprises software 3331, which is stored in or accessible by the UE 3330 and executable by the processing circuitry 3338. The software 3331 includes a client application 3332. The client application 3332 may be operable to provide a service to a human or non-human user via the UE 3330, with the support of the host computer 3310. In the host computer 3310, an executing host application 3312 may communicate with the executing client application 3332 via the OTT connection 3350 terminating at the UE 3330 and the host computer 3310. In providing the service to the user, the client application 3332 may receive request data from the host application 3312 and provide user data in response to the request data. The OTT connection 3350 may transfer both the request data and the user data. The client application 3332 may interact with the user to generate the user data that it provides.

Figure 18:
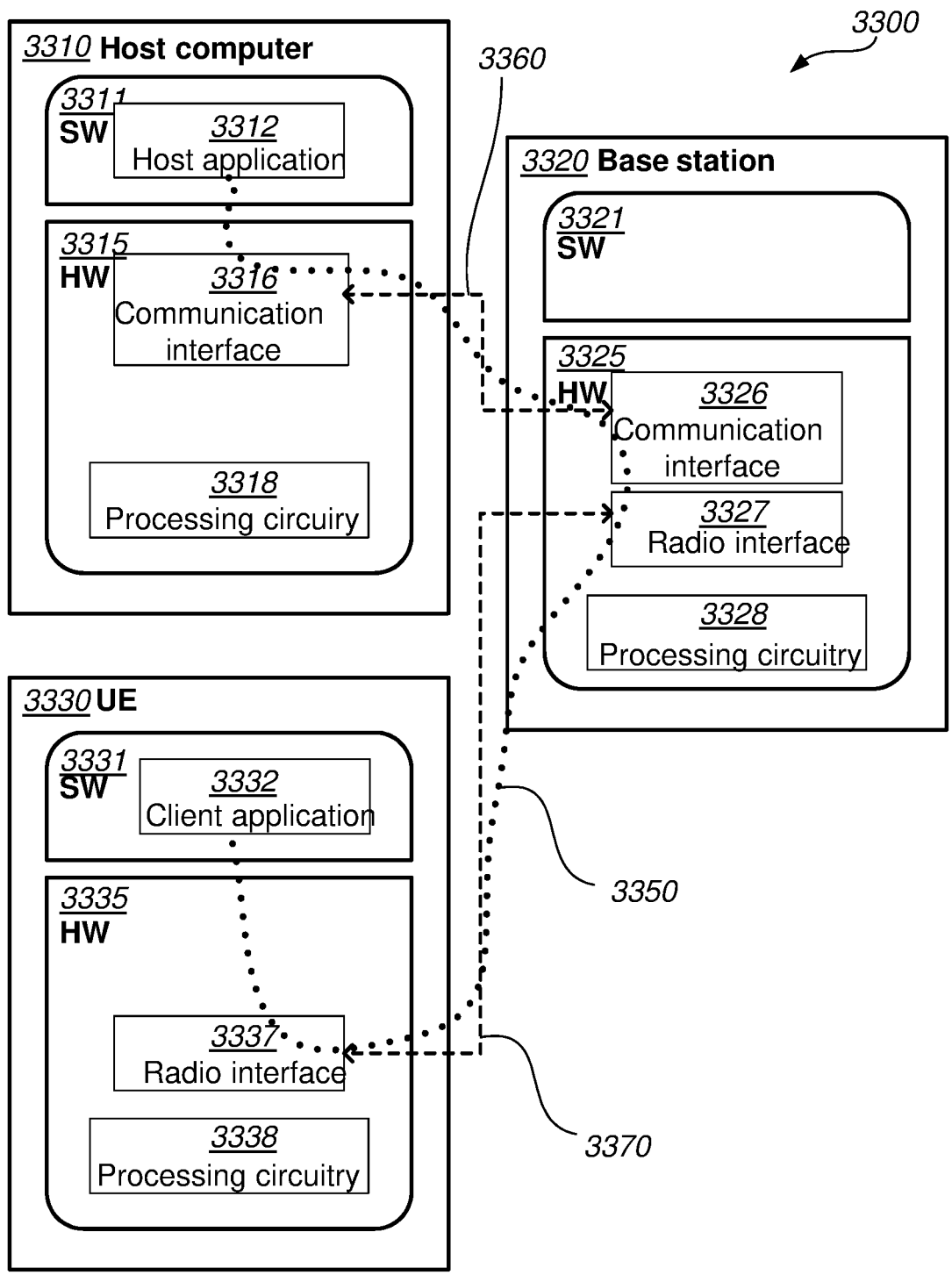
FIG. 18 is a generalized block diagram of a host computer communicating via a base station with a user equipment over a partially wireless connection.

It is noted that the host computer 3310, base station 3320 and UE 3330 illustrated in FIG. 18 may be identical to the host computer 3230, one of the base stations 3212a, 3212b, 3212c and one of the UEs 3291, 3292 of FIG. 17, respectively. This is to say, the inner workings of these entities may be as shown in FIG. 18 and independently, the surrounding network topology may be that of FIG. 17.

In FIG. 18, the OTT connection 3350 has been drawn abstractly to illustrate the communication between the host computer 3310 and the use equipment 3330 via the base station 3320, without explicit reference to any intermediary devices and the precise routing of messages via these devices. Network infrastructure may determine the routing, which it may be configured to hide from the UE 3330 or from the service provider operating the host computer 3310, or both. While the OTT connection 3350 is active, the network infrastructure may further take decisions by which it dynamically changes the routing (e.g., on the basis of load balancing consideration or reconfiguration of the network).

The wireless connection 3370 between the UE 3330 and the base station 3320 is in accordance with the teachings of the embodiments described throughout this disclosure. One or more of the various embodiments improve the performance of OTT services provided to the UE 3330 using the OTT connection 3350, in which the wireless connection 3370 forms the last segment. More precisely, the teachings of these embodiments may improve the [select the applicable RAN effect: data rate, latency, power consumption] and thereby provide benefits such as reduced user waiting time, relaxed restriction on file size, better responsiveness, extended battery lifetime.

A measurement procedure may be provided for the purpose of monitoring data rate, latency and other factors on which the one or more embodiments improve. There may further be an optional network functionality for reconfiguring the OTT connection 3350 between the host computer 3310 and UE 3330, in response to variations in the measurement results. The measurement procedure and/or the network functionality for reconfiguring the OTT connection 3350 may be implemented in the software 3311 of the host computer 3310 or in the software 3331 of the UE 3330, or both. In embodiments, sensors (not shown) may be deployed in or in association with communication devices through which the OTT connection 3350 passes; the sensors may participate in the measurement procedure by supplying values of the monitored quantities exemplified above, or supplying values of other physical quantities from which software 3311, 3331 may compute or estimate the monitored quantities. The reconfiguring of the OTT connection 3350 may include message format, retransmission settings, preferred routing etc.; the reconfiguring need not affect the base station 3320, and it may be unknown or imperceptible to the base station 3320. Such procedures and functionalities may be known and practiced in the art. In certain embodiments, measurements may involve proprietary UE signaling facilitating the host computer's 3310 measurements of throughput, propagation times, latency and the like. The measurements may be implemented in that the software 3311, 3331 causes messages to be transmitted, in particular empty or 'dummy' messages, using the OTT connection 3350 while it monitors propagation times, errors etc.

FIG. 19 is a flowchart illustrating a method implemented in a communication system, in accordance with one embodiment. The communication system includes a host computer, a base station such as a AP STA, and a UE such as a Non-AP STA which may be those described with reference to FIG. 17 and FIG. 18. For simplicity of the present disclosure, only drawing references to FIG. 19 will be included in this section. In a first step 3410 of the method, the host computer provides user data. In an optional substep 3411 of the first step 3410, the host computer provides the user data by executing a host application. In a second step 3420, the host computer initiates a transmission carrying the user data to the UE. In an optional third step 3430, the base station transmits to the UE the user data which was carried in the transmission that the host computer initiated, in accordance with the teachings of the embodiments described throughout this disclosure. In an optional fourth step 3440, the UE executes a client application associated with the host application executed by the host computer.

FIG. 20 is a flowchart illustrating a method implemented in a communication system, in accordance with one embodiment. The communication system includes a host computer, a base station such as a AP STA, and a UE such as a Non-AP STA which may be those described with reference to FIG. 17 and FIG. 18. For simplicity of the present disclosure, only drawing references to FIG. 20 will be included in this section. In a first step 3510 of the method, the host computer provides user data. In an optional substep (not shown) the host computer provides the user data by executing a host application. In a second step 3520, the host computer initiates a transmission carrying the user data to the UE. The transmission may pass via the base station, in accordance with the teachings of the embodiments described throughout this disclosure. In an optional third step 3530, the UE receives the user data carried in the transmission.

FIG. 21 is a flowchart illustrating a method implemented in a communication system, in accordance with one embodiment. The communication system includes a host computer, a base station such as a AP STA, and a UE such as a Non-AP STA which may be those described with reference to FIG. 17 and FIG. 18. For simplicity of the present disclosure, only drawing references to FIG. 21 will be included in this section. In an optional first step 3610 of the method, the UE receives input data provided by the host computer. Additionally or alternatively, in an optional second step 3620, the UE provides user data. In an optional substep 3621 of the second step 3620, the UE provides the user data by executing a client application. In a further optional substep 3611 of the first step 3610, the UE executes a client application which provides the user data in reaction to the received input data provided by the host computer. In providing the user data, the executed client application may further consider user input received from the user. Regardless of the specific manner in which the user data was provided, the UE initiates, in an optional third substep 3630, transmission of the user data to the host computer. In a fourth step 3640 of the method, the host computer receives the user data transmitted from the UE, in accordance with the teachings of the embodiments described throughout this disclosure.

FIG. 21 is a flowchart illustrating a method implemented in a communication system, in accordance with one embodiment. The communication system includes a host computer, a base station such as a AP STA, and a UE such as a Non-AP STA which may be those described with reference to FIG. 17 and FIG. 18. For simplicity of the present disclosure, only drawing references to FIG. 21 will be included in this section. In an optional first step 3710 of the method, in accordance with the teachings of the embodiments described throughout this disclosure, the base station receives user data from the UE. In an optional second step 3720, the base station initiates transmission of the received user data to the host computer. In a third step 3730, the host computer receives the user data carried in the transmission initiated by the base station.

ABBREVIATIONS

| Abbreviation | Explanation |
| --- | --- |
| CU | Central Unit |
| DC | Dual Connectivity |
| DU | Decentralized Unit |
| GTP-U | GPRS Tunneling Protocol User plane |
| MC | Multi-Connectivity |
| NGC | New Generation Core |
| NR | New Generation Radio |
| UE | User Equipment |

The invention claimed is:

1. A method performed by a first unit for handling a connection between the first unit and multiple second units in a wireless communications network including a user equipment (UE), the method comprising:
obtaining from each of the multiple second units a respective indication of at least one of a plurality of versions of NR User plane (NR-U) protocols each of the multiple second units supports; and
deciding which one of the plurality of versions of NR-U protocols to use for the connection based on the indications received from the multiple second units, the first unit being a controlling unit (CU), the multiple second units being distributed units (DUs), at least one of the DUs being configured to communicate with the UE.

2. The method according to claim 1, further comprising:
sending to each respective second unit of the multiple second units an indication of the decided version of NR-U protocol to use for the connection.

3. A method performed by a second unit for handling a connection between a first unit and multiple second units in a wireless communications network including a user equipment (UE), the method comprising:
sending to the first unit an indication of at least one of a plurality of versions of NR User plane (NR-U) protocols the second unit supports; and
receiving from the first unit an indication of a decided version of NR-U protocol to use for the connection, which version of NR-U protocol is decided based on the sent indication of which at least one version of NR-U protocol the second unit supports together with which at least one version of NR-U protocol that at least one other second unit of the multiple second units supports, the first unit being a controlling unit (CU), the multiple second units being distributed units (DUs), at least one of the DUs being configured to communicate with the UE.

4. A first unit for handling a connection between the first unit and multiple second units in a wireless communications network including a user equipment (UE), the first unit including processing circuitry, the processing circuitry being configured to:
obtain from each of the multiple second units a respective indication of at least one of a plurality of versions of NR User plane protocols (NR-U) the second unit supports; and
decide which one of the plurality of versions of NR-U protocols to use for the connection based on the indications received from the multiple second units, the first unit being a controlling unit (CU), the multiple second units being distributed units (DUs), at least one of the DUs being configured to communicate with the UE.

5. The first unit according to claim 4, the first unit further being configured to:
- send to each of the respective multiple second units an indication of the decided version of NR-U protocol to use for the connection.

6. A second unit for handling a connection between a first unit and multiple second units in a wireless communications network including a user equipment (UE), the second unit including processing circuitry, the processing circuitry being configured to:
- send to the first unit an indication of at least one of a plurality of versions of NR User plane (NR-U) protocols the second unit supports; and
- receive from the first unit an indication of a decided version of NR-U protocol to use for the connection, which version of NR-U protocol is decided based on the sent indication of which at least one version of NR-U protocol the second unit supports together with which at least one version of NR-U protocol that at least one other second unit of the multiple second units supports, the first unit being a controlling unit (CU), the multiple second units being distributed units (DUs), at least one of the DUs being configured to communicate with the UE.

* * * * *